US010812723B2

(12) United States Patent
Imanishi

(10) Patent No.: US 10,812,723 B2
(45) Date of Patent: Oct. 20, 2020

(54) IMAGING DEVICE AND IMAGING CONTROL METHOD CAPABLE OF PREVENTING CAMERA SHAKE

(71) Applicant: FUJIFILM Corporation, Tokyo (JP)

(72) Inventor: Kazutaka Imanishi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/280,051

(22) Filed: Feb. 20, 2019

(65) Prior Publication Data

US 2019/0191092 A1 Jun. 20, 2019

Related U.S. Application Data

(63) Continuation of application No. PCT/JP2017/025844, filed on Jul. 18, 2017.

(30) Foreign Application Priority Data

Sep. 14, 2016 (JP) ................................ 2016-179437

(51) Int. Cl.
*H04N 5/228* (2006.01)
*H04N 5/232* (2006.01)
(Continued)

(52) U.S. Cl.
CPC ....... *H04N 5/23287* (2013.01); *G02B 27/646* (2013.01); *G03B 5/00* (2013.01);
(Continued)

(58) Field of Classification Search
CPC ........... H04N 5/23287; H04N 5/23258; G02B 27/646; G03B 5/00; G03B 2205/0007
(Continued)

(56) References Cited

U.S. PATENT DOCUMENTS 6,374,048 B1 * 4/2002 Uenaka .................... G03B 5/00 348/208.99
7,817,185 B2 10/2010 Kurata
(Continued)

FOREIGN PATENT DOCUMENTS

CN 101090456 12/2007
CN 101790033 7/2010
(Continued)

OTHER PUBLICATIONS

"International Search Report (Form PCT/ISA/210) of PCT/JP2017/025844," dated Sep. 26, 2017, with English translation thereof, pp. 1-3.

(Continued)

*Primary Examiner* — Usman A Khan
(74) *Attorney, Agent, or Firm* — JCIPRNET

(57) ABSTRACT

There are provided an imaging device and an imaging control method that can achieve both subject-following performance during a shake-correcting operation and a reduction in the size of a lens. The object is achieved by an imaging device including a shake detection unit that continuously detects a shake, a correction unit that corrects a shake of a subject image by moving an imaging lens and an imaging element relative to each other in a direction orthogonal to a direction of an optical axis of an incidence ray according to the detected shake, and a control unit that limits a movable range of relative movement to the inside of a rectangle included in a circle, which is the maximum movable range, in a case where imaging is performed at a certain frame rate.

20 Claims, 17 Drawing Sheets

(51) Int. Cl.
*G03B 5/00* (2006.01)
*G02B 27/64* (2006.01)
*G03B 13/02* (2006.01)

(52) U.S. Cl.
CPC ............ *G03B 13/02* (2013.01); *H04N 5/232* (2013.01); *H04N 5/23258* (2013.01); *H04N 5/23293* (2013.01); *G03B 2205/0007* (2013.01)

(58) Field of Classification Search
USPC .................................................... 348/208.11
See application file for complete search history.

(56) References Cited

U.S. PATENT DOCUMENTS 8,488,008 B2 7/2013 Kaneko et al.
2009/0003813 A1 1/2009 Ohishi
2011/0007133 A1* 1/2011 Imanishi ............... G03B 17/00 348/42
2011/0234826 A1* 9/2011 Nguyen .................. G03B 5/00 348/208.6
2016/0134814 A1 5/2016 Yoneyama

FOREIGN PATENT DOCUMENTS

| | | |
|---|---|---|
| JP | H06035025 | 2/1994 |
| JP | 3162126 | 4/2001 |
| JP | 2008203312 | 9/2008 |
| JP | 2015021992 | 2/2015 |

OTHER PUBLICATIONS

"Written Opinion of the International Searching Authority (Form PCT/ISA/237) of PCT/JP2017/025844," dated Sep. 26, 2017, with English translation thereof, pp. 1-7.
Office Action of Deutsches Counterpart Application, with English translation thereof, dated Feb. 24, 2020, pp. 1-7.
Office Action of China Counterpart Application, with English translation thereof, dated Apr. 27, 2020, pp. 1-15.

* cited by examiner

IMAGING DEVICE AND IMAGING CONTROL METHOD CAPABLE OF PREVENTING CAMERA SHAKE

CROSS-REFERENCE TO RELATED APPLICATIONS

This application is a Continuation of PCT International Application No. PCT/JP2017/025844 filed on Jul. 18, 2017, which claims priority under 35 U.S.C § 119(a) to Japanese Patent Application No. 2016-179437 filed on Sep. 14, 2016. Each of the above application(s) is hereby expressly incorporated by reference, in its entirety, into the present application.

BACKGROUND OF THE INVENTION

1. Field of the Invention

The present invention relates to an imaging device and an imaging control method, and more particularly, to an imaging device and an imaging control method that prevent the shake of a taken image caused by a camera shake.

2. Description of the Related Art

An optical image stabilizer (OIS), which can detect the shake of an imaging device, correct an image shake by shifting a correction lens according to the detected shake, and obtain a sharp image, is known in regard to an imaging device, such as a digital camera.

JP3162126B discloses a technique that reduces the size of a lens barrel by forming the movable range of a correction optical system in a circular shape or an octagonal shape in a camera using OIS.

SUMMARY OF THE INVENTION

However, in a case where the movable range of a correction lens is formed in a circular shape or an octagonal shape and a panning operation or a tilt operation is performed in a state where the correction lens is present at a position displaced from a movement center, a correctable range in a horizontal direction and a correctable range in a vertical direction affect each other due to the positions thereof. For this reason, shake correction suddenly stops. For example, a moving distance in the horizontal direction is reduced at a position displaced in the vertical direction. For this reason, there is a problem that it is difficult to capture a subject on a finder or a display.

The invention has been made in consideration of the above-mentioned circumstances, and an object of the invention is to provide an imaging device and an imaging control method that can achieve both subject-following performance during a shake-correcting operation and a reduction in the size of a lens.

In order to achieve the object, an imaging device according to an aspect comprises: an imaging unit that includes an imaging element converting a received subject image into an image signal and an imaging lens allowing an incidence ray, which is incident from a subject, to be incident on the imaging element, at least one of the imaging lens or the imaging element being movable in a direction orthogonal to a direction of an optical axis of the incidence ray, and a maximum movable range of relative movement of the imaging lens and the imaging element being a circle; a shake detection unit that continuously detects a shake of the imaging unit; a correction unit that corrects a shake of the subject image by moving the imaging lens and the imaging element relative to each other according to the detected shake; and a control unit that limits the movable range of the relative movement performed by the correction unit to the inside of a rectangle included in the circle in a case where imaging is performed at a certain frame rate by the imaging unit.

According to this aspect, the movable range of the relative movement performed by the correction unit is limited to the inside of a rectangle included in the circle, which is the maximum movable range, in a case where imaging is performed at a certain frame rate by the imaging unit. Accordingly, both subject-following performance during a shake-correcting operation and a reduction in the size of the lens can be achieved.

It is preferable that the control unit sets the movable range of the relative movement to the inside of the circle in a case where a static image is to be taken. Accordingly, a shake correction effect can be ensured to the maximum extent in a case where a static image is to be taken.

The imaging device preferably further comprises a display unit that displays a live view image allowing a user to check the subject image, and it is preferable that the control unit limits the movable range of the relative movement to the inside of the rectangle in a case where the live view image is to be taken. Accordingly, a live view image of which frames are connected to each other well can be taken.

It is preferable that the control unit limits the movable range of the relative movement to the inside of the rectangle in a case where a video is to be taken. Accordingly, a video of which frames are connected to each other well can be taken.

It is preferable that the control unit limits the movable range of the relative movement to the inside of the rectangle in a case where continuous imaging for continuously taking static images is to be performed. Accordingly, continuous static images of which frames are connected to each other well can be taken.

It is preferable that the rectangle is inscribed in the circle. Further, it is preferable that the rectangle is a square. Accordingly, the movable range can be made as large as possible.

It is preferable that the rectangle has sides parallel to a horizontal direction and a vertical direction of an imaging field of view of the imaging unit, respectively. Accordingly, subject-following performance can be ensured even in a case where a panning operation for shaking the imaging device in the horizontal direction and/or a tilt operation for shaking the imaging device in the vertical direction is performed.

It is preferable that the control unit limits the movable range of the relative movement to the inside of the rectangle after relative positions of the imaging lens and the imaging element enter the rectangle. Accordingly, it is possible to prevent a sense of discomfort in a case where the movable range is to be switched.

It is preferable that the correction unit moves the imaging lens. Further, the correction unit may move the imaging element. This aspect can be applied to a lens shift type shake correction mechanism and/or a sensor shift type shake correction mechanism.

In order to achieve the object, an imaging control method according to another aspect comprises: an imaging step of imaging a subject by an imaging unit that includes an imaging element converting a received subject image into an image signal and an imaging lens allowing an incidence ray, which is incident from the subject, to be incident on the imaging element, at least one of the imaging lens or the imaging element being movable in a direction orthogonal to a direction of an optical axis of the incidence ray, and a maximum movable range of relative movement of the imaging lens and the imaging element being a circle; a shake detection step of continuously detecting a shake of the imaging unit; a correction step of correcting a shake of the subject image by moving the imaging lens and the imaging element relative to each other according to the detected shake; and a control step of limiting the movable range of the relative movement performed in the correction step to the inside of a rectangle included in the circle in a case where imaging is performed at a certain frame rate in the imaging step.

According to this aspect, the movable range of the relative movement performed by the correction unit is limited to the inside of a rectangle included in the circle, which is the maximum movable range, in a case where imaging is performed at a certain frame rate by the imaging unit. Accordingly, both subject-following performance during a shake-correcting operation and a reduction in the size of the lens can be achieved.

Further, a program that allows a computer to perform the above-mentioned imaging control method and a computer-readable non-temporary recording medium in which the program is recorded are also included in this aspect.

According to the invention, it is possible to achieve both subject-following performance during a shake-correcting operation and a reduction in the size of a lens.

DESCRIPTION OF THE PREFERRED EMBODIMENTS

Preferred embodiments of the invention will be described in detail below with reference to the accompanying drawings.

<Overall Structure of Digital Camera>

Figure 1:
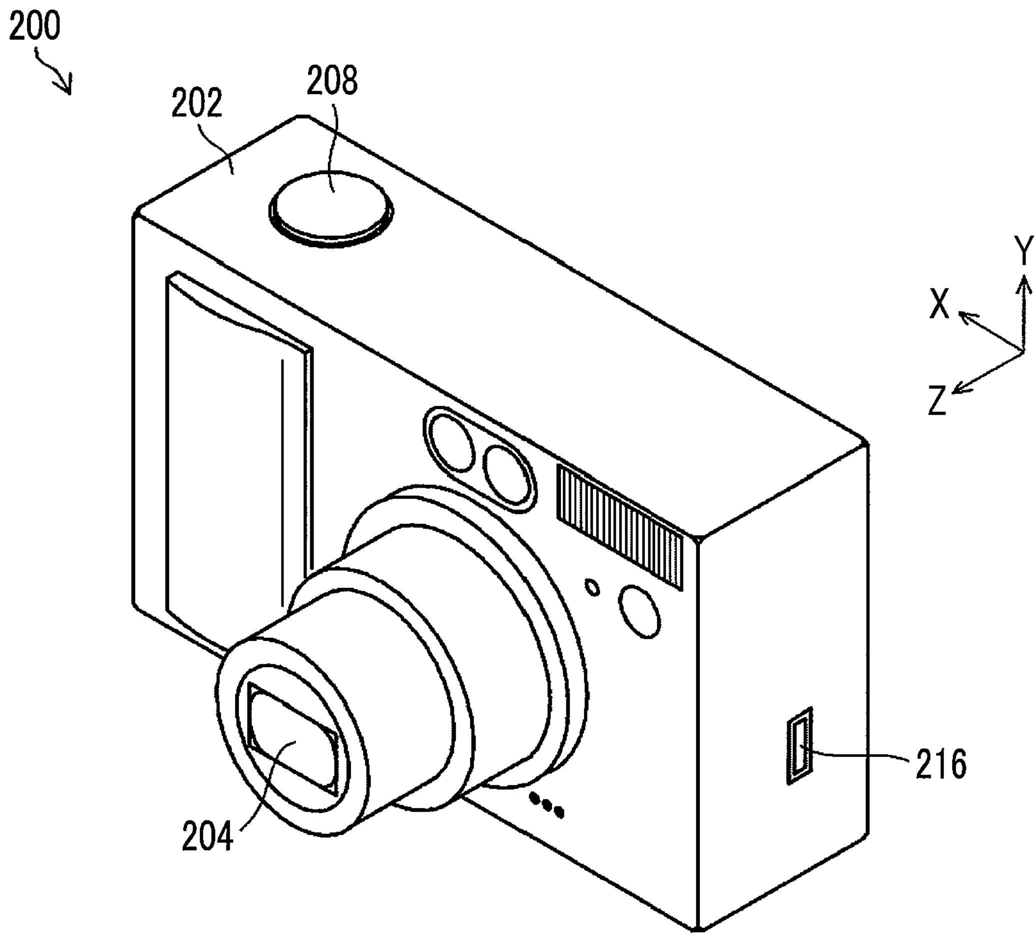
FIG. 1 is a front perspective view showing the appearance of a digital camera 200.
Figure 2:
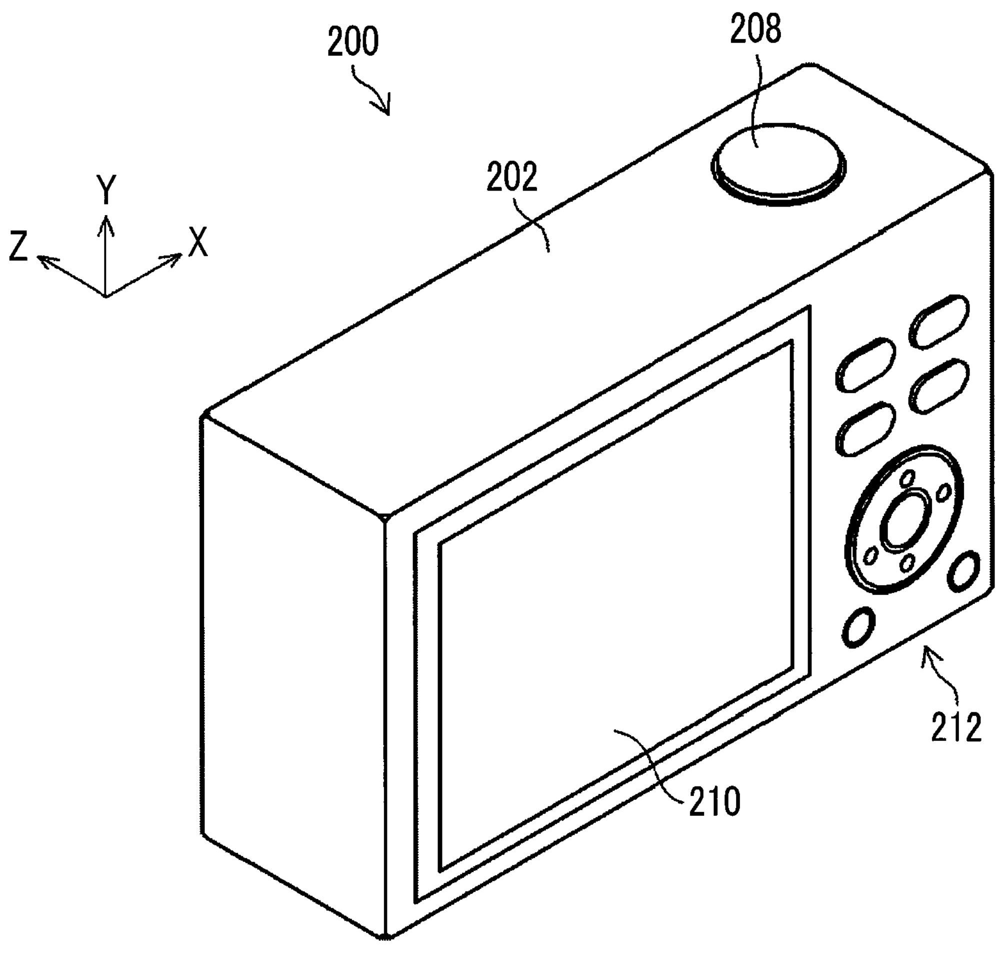
FIG. 2 is a rear perspective view showing the appearance of the digital camera 200.

FIGS. 1 and 2 are a front perspective view and a rear perspective view showing an example of the appearance of a digital camera 200 that is an imaging device according to this embodiment, respectively.

The digital camera 200 includes a camera body 202 and an imaging lens 204 that is mounted on the front surface of the camera body 202. The imaging lens 204 may be adapted to be attachable and detachable by a lens-side mount and a camera-side mount.

A shutter button 208 is provided on the upper surface of the camera body 202.

The shutter button 208 is formed of a two-stage button including a switch S1 that is turned on in a case where the shutter button 208 is half pressed and a switch S2 that is turned on in a case where the shutter button 208 is fully pressed. The digital camera 200 performs an automatic exposure (AE) operation and an auto focus (AF) operation in a case where the shutter button 208 is half pressed, and performs main imaging in a case where the shutter button 208 is fully pressed.

Further, an LCD monitor 210 and operation button 212 are provided on the rear surface of the camera body 202.

The LCD monitor 210 is a display unit that displays live view images, taken images, imaging conditions of the digital camera 200, or the like. The horizontal direction and the vertical direction of a live view image and a taken image to be displayed on the LCD monitor 210 are parallel to the horizontal direction (X direction) and the vertical direction (Y direction) of the imaging field of view of an imaging unit 10 (the range of a taken image), respectively.

The operation button 212 is an operation unit that includes a power switch, an imaging mode dial, a camera shake-correction switch, and the like.

The digital camera 200 has a static image mode, a continuous imaging mode, and a video mode as imaging modes. In the static image mode, one static image is taken according to an instruction of the main imaging. In the continuous imaging mode, a plurality of static images are taken at a constant time interval according to an instruction of the main imaging. Further, in the video mode, a video is taken according to an instruction of the main imaging.

Figure 3:
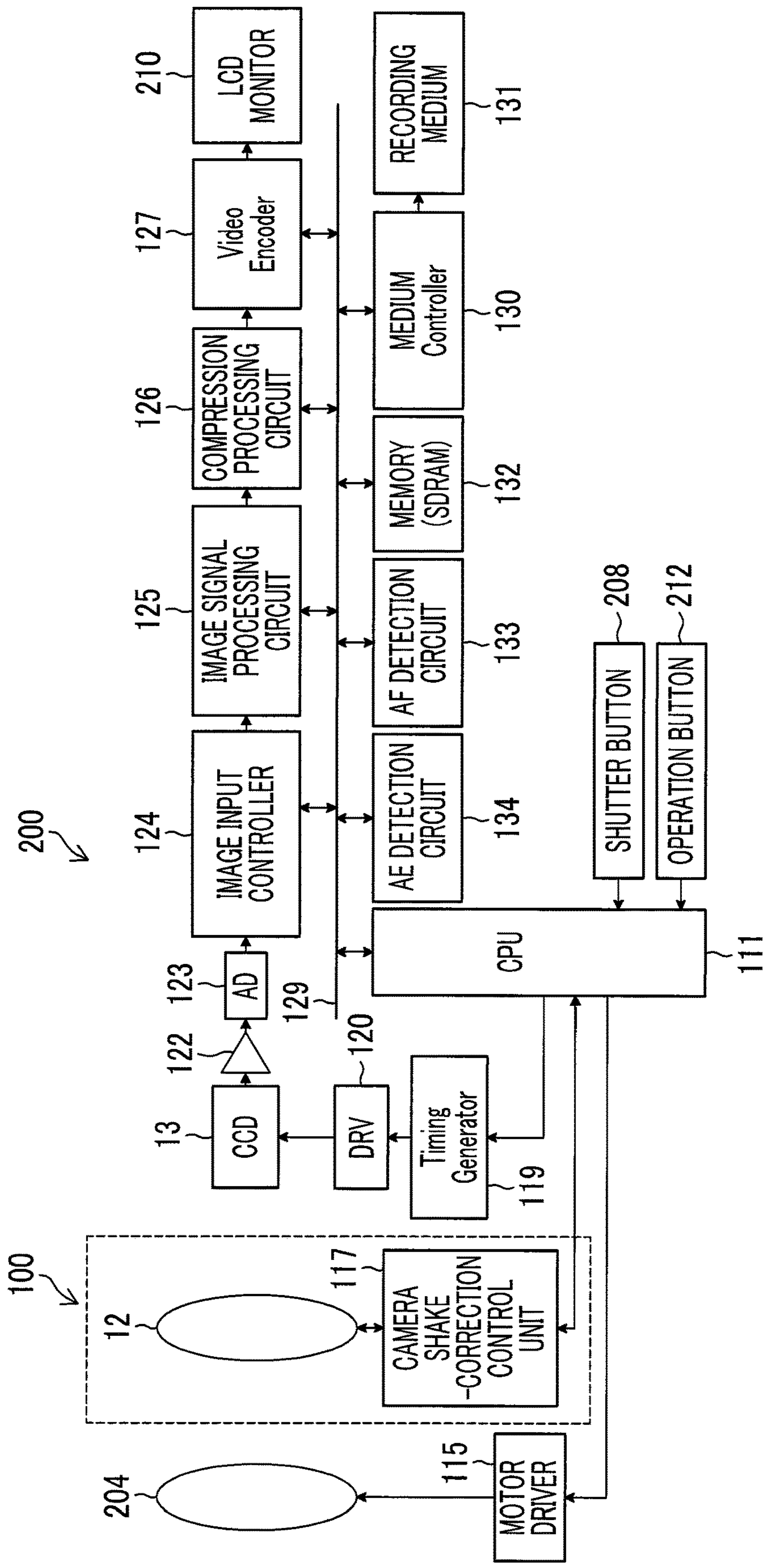
FIG. 3 is a block diagram showing the internal configuration of the digital camera 200.

In the main imaging, an image obtained from imaging (main taken image) is recorded on a recording medium 131 (see FIG. 3). Further, the image recorded on the recording medium 131 is played back and displayed on the LCD monitor 210 in a case where the digital camera 200 is set to a playback mode by the operation of the operation button 212.

<Internal Configuration of Digital Camera>

FIG. 3 is a block diagram showing an example of the internal configuration of the digital camera 200. As shown in FIG. 3, the digital camera 200 comprises a charge coupled device (CCD) 13, a camera shake-correction device 100, a central processing unit (CPU) 111, a motor driver 115 for focusing, a timing generator 119, a CCD driver 120, an analog signal processing unit 122, an analog/digital (A/D)

converter 123, an image input controller 124, an image signal processing circuit 125, a compression processing circuit 126, a video encoder 127, a bus 129, a medium controller 130, a recording medium 131, a memory 132, an AF detection circuit 133, an AE detection circuit 134, and the like, in addition to the imaging lens 204, the shutter button 208, the LCD monitor 210, and the operation button 212 having been described above.

The shutter button 208 and the operation button 212 output signals, which correspond to operations, to the CPU 111. The respective components are operated under the control of the CPU 111, and the CPU 111 controls the respective components of the digital camera 200 by executing predetermined control programs on the basis of inputs from the shutter button 208 and the operation button 212.

A program read only memory (ROM) is built in the CPU 111, and various data and the like required for control are recorded in the program ROM in addition to control programs that are executed by the CPU 111. The CPU 111 controls the respective components of the digital camera 200 by reading the control programs, which are recorded in the program ROM, into the memory 132 and sequentially executing the control programs.

The memory 132 is used as a temporary storage area for image data and the like and various work area in addition to an area where a program is executed.

The imaging lens 204 is driven by the motor driver 115 for focusing and is moved forward and backward on the optical axis of the imaging lens 204. The CPU 111 controls the movement of the imaging lens 204 through the motor driver 115 for focusing to perform focusing.

The camera shake-correction device 100 includes a camera shake-correction mechanism 116 (see FIG. 5) that includes a vibration-proof lens 12 and a camera shake-correction control unit 117 that controls the camera shake-correction mechanism 116. The camera shake-correction device 100 corrects the shake of a subject image of the CCD 13 that is caused by the shake of the digital camera 200. The details of the camera shake-correction mechanism 116 and the camera shake-correction control unit 117 will be described later.

The imaging lens 204 and the vibration-proof lens 12 (an example of an imaging lens) allow subject light (an example of an incidence ray), which is incident from a subject, to be incident on the CCD 13 (an example of an imaging element). The subject light, which is incident on the CCD 13, forms an image on the light-receiving surface of the CCD 13. The CCD 13 includes the light-receiving surface on which a plurality of light-receiving elements are arranged in the form of a matrix in the X direction and the Y direction forming the imaging field of view, and converts a subject image, which is formed on the light-receiving surface, into electrical signals by each of the light-receiving elements.

The CCD 13 outputs electric charges, which are accumulated in each pixel, line by line as serial image signals in synchronization with a vertical transfer clock and a horizontal transfer clock that are supplied from the timing generator 119 through the CCD driver 120. The CPU 111 controls the drive of the CCD 13 by controlling the timing generator 119.

The electric charge accumulation time (exposure time) of each pixel is determined depending on an electronic shutter-driving signal that is applied from the timing generator 119. The CPU 111 gives an instruction of electric charge accumulation time to the timing generator 119.

Further, the output of an image signal is started in a case where the digital camera 200 is set to an imaging mode. That is, in a case where the digital camera 200 is set to the imaging mode, the output of an image signal is started to display a live view image on the LCD monitor 210. The live view image is taken at a frame rate of, for example, 30 frames per second. In a case where the main imaging is instructed, the output of an image signal for the live view image is temporarily stopped. In a case where the main imaging is ended, the output of an image signal for the live view image is started again. Due to this live view image, a user can check a subject image and set the composition of the main imaging. An electronic finder may be provided on the rear surface of the digital camera 200, and the live view image may be displayed on the electronic finder.

An image signal, which is output from the CCD 13, is an analog signal, and this analog image signal is received in the analog signal processing unit 122.

The analog signal processing unit 122 includes a correlated double sampling circuit and an automatic gain control circuit. The correlated double sampling circuit removes noise included in the image signal, and the automatic gain control circuit amplifies the image signal, from which noise is removed, with a predetermined gain. The analog image signal, which is subjected to required signal processing by the analog signal processing unit 122, is received in the A/D converter 123.

The A/D converter 123 converts the received analog image signal into a digital image signal that has a gradation width corresponding to a predetermined bit. This image signal is so-called RAW data, and has a gradation value that represents the density of R (Red), G (Green), and B (Blue) for each pixel.

Since a line buffer having a predetermined capacity is built in the image input controller 124, the image input controller 124 accumulates image signals corresponding to one frame that are output from the A/D converter 123. The image signals corresponding to one frame, which are accumulated in the image input controller 124, are stored in the memory 132 through the bus 129.

The image signal processing circuit 125, the compression processing circuit 126, the video encoder 127, the medium controller 130, the AF detection circuit 133, the AE detection circuit 134, and the like are connected to the bus 129 in addition to the CPU 111, the memory 132, and the image input controller 124; and these can send and receive information to and from each other through the bus 129.

The image signals corresponding to one frame, which are stored in the memory 132, are received in the image signal processing circuit 125 in order of points (in order of pixels).

The image signal processing circuit 125 performs predetermined signal processing on the image signals that are received in order of points and correspond to the respective colors of R, G, and B, and generate image signals (Y/C signals) that include brightness signals Y and color difference signals Cr and Cb.

The AF detection circuit 133 receives the image signals, which are stored in the memory 132 through the image input controller 124 and correspond to R, G, and B, according to a command of the CPU 111 and calculates a focus evaluation value required for AF control. The AF detection circuit 133 includes a high-pass filter that allows only a high-frequency component of a G signal to pass, an absolute value processing unit, a focus area extraction unit that extracts signals of a predetermined focus area set on a screen, and an integration unit that integrates absolute value data of the focus area; and outputs the absolute value data of the focus area, which is integrated by the integration unit, to the CPU 111 as the focus evaluation value. The CPU 111 searches for a position where the focus evaluation value output from the AF detection circuit 133 becomes maximum, and focuses on a main subject by moving the imaging lens 204 to the position.

The AE detection circuit 134 receives the image signals, which are stored in the memory 132 through the image input controller 124 and correspond to R, G, and B, according to a command of the CPU 111 and calculates an integrated value required for AE control. The CPU 111 calculates a brightness value from the integrated value, and obtains an exposure value from the brightness value. Further, the CPU 111 determines an F number and a shutter speed from the exposure value according to a predetermined program diagram.

The compression processing circuit 126 performs compression processing, such as JPEG (Joint Photographic coding Experts Group), on an input Y/C signal according to a compression command output from the CPU 111, and generates compressed image data. Further, the compression processing circuit 126 performs decompression processing having a predetermined format on input compressed image data according to a decompression command output from the CPU 111, and generates uncompressed image data.

The video encoder 127 controls a display on the LCD monitor 210 according to a command output from the CPU 111.

The medium controller 130 controls the reading/writing of data from/on a recording medium 131 according to a command output from the CPU 111. The recording medium 131 may be attachably and detachably mounted on the camera body, or may be built in the camera body. In a case where the recording medium 131 is to be attachably and detachably mounted on the camera body, a card slot is provided in the camera body and the recording medium 131 is used while being loaded in the card slot.

<Structure of Camera Shake-Correction Mechanism>

Figure 4:
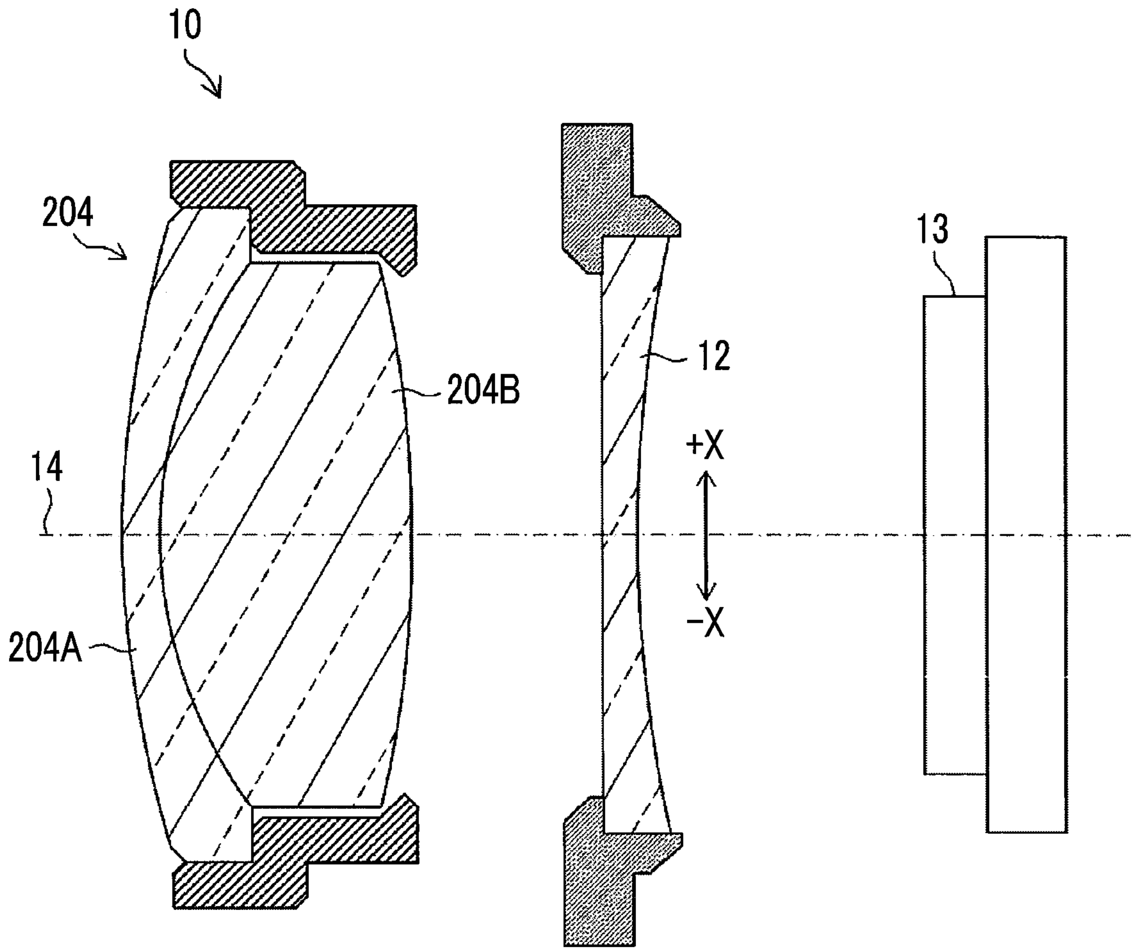
FIG. 4 is a schematic diagram showing an imaging unit 10.

FIG. 4 is a schematic diagram showing an imaging unit 10. As shown in FIG. 4, the imaging unit 10 includes the imaging lens 204, the vibration-proof lens 12, and the CCD 13. An optical system of the digital camera 200 includes the imaging lens 204 and the vibration-proof lens 12. The imaging lens 204 is composed of two lenses 204A and 204B.

The CCD 13 is disposed on an optical axis 14 of the optical system, and converts a subject image into electrical signals as described above. Since a subject image is moved on the CCD 13 during exposure in a case where a camera shake occurs on the imaging unit 10, electrical signals of a blurred image are generated from the CCD 13. A camera shake is vibration that is generated on the digital camera 200 (imaging unit 10) in a case where a user takes an image by the digital camera 200.

The digital camera 200 is adapted to be switched to a camera shake-correction mode and a camera shake-correction-unavailable mode by the operation button 212, separately from the setting of the imaging mode. In the camera shake-correction mode, the movement of the vibration-proof lens 12 is controlled so the shake of the subject image is canceled. In the camera shake-correction-unavailable mode, the vibration-proof lens 12 is controlled so as to stop.

The digital camera 200 comprises an angular velocity sensor 50 (see FIG. 8, an example of a shake detection unit) that is provided in the camera body or a lens assembly and continuously detects the shake of the imaging unit 10. The angular velocity sensor 50 detects a shake in the X direction and the Y direction, and outputs a signal that represents the angular velocity of the shake. An angular acceleration sensor, which outputs a signal representing an angular acceleration, may be used instead of the angular velocity sensor 50.

In a case where a camera shake does not occur on the imaging unit 10, the optical axis of the vibration-proof lens 12 coincides with the optical axis 14 of the optical system. In a case where the camera shake of the imaging unit 10 in the X direction and/or the Y direction is detected by the angular velocity sensor 50, the vibration-proof lens 12 is moved in the X direction and/or the Y direction orthogonal to the optical axis 14 (the direction of the optical axis) according to the degree and direction of the camera shake. An arrow shown in FIG. 4 indicates movement in +X direction and −X direction. Accordingly, since a subject image to be formed on the CCD 13 is substantially in a stop state, signals representing a sharp image are output from the CCD 13.

Figure 5:
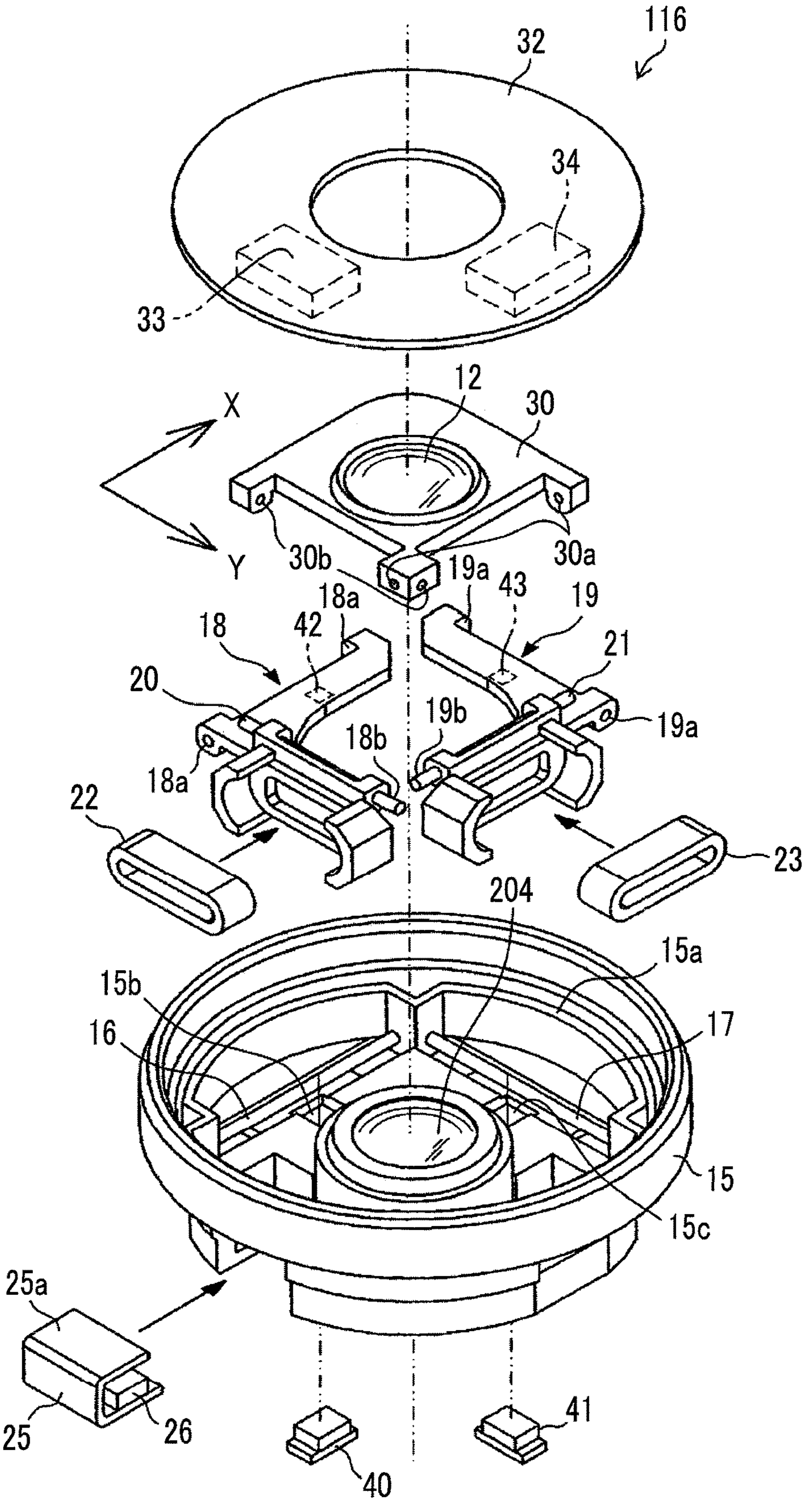
FIG. 5 is an exploded perspective view of a camera shake-correction mechanism 116.
Figure 6:
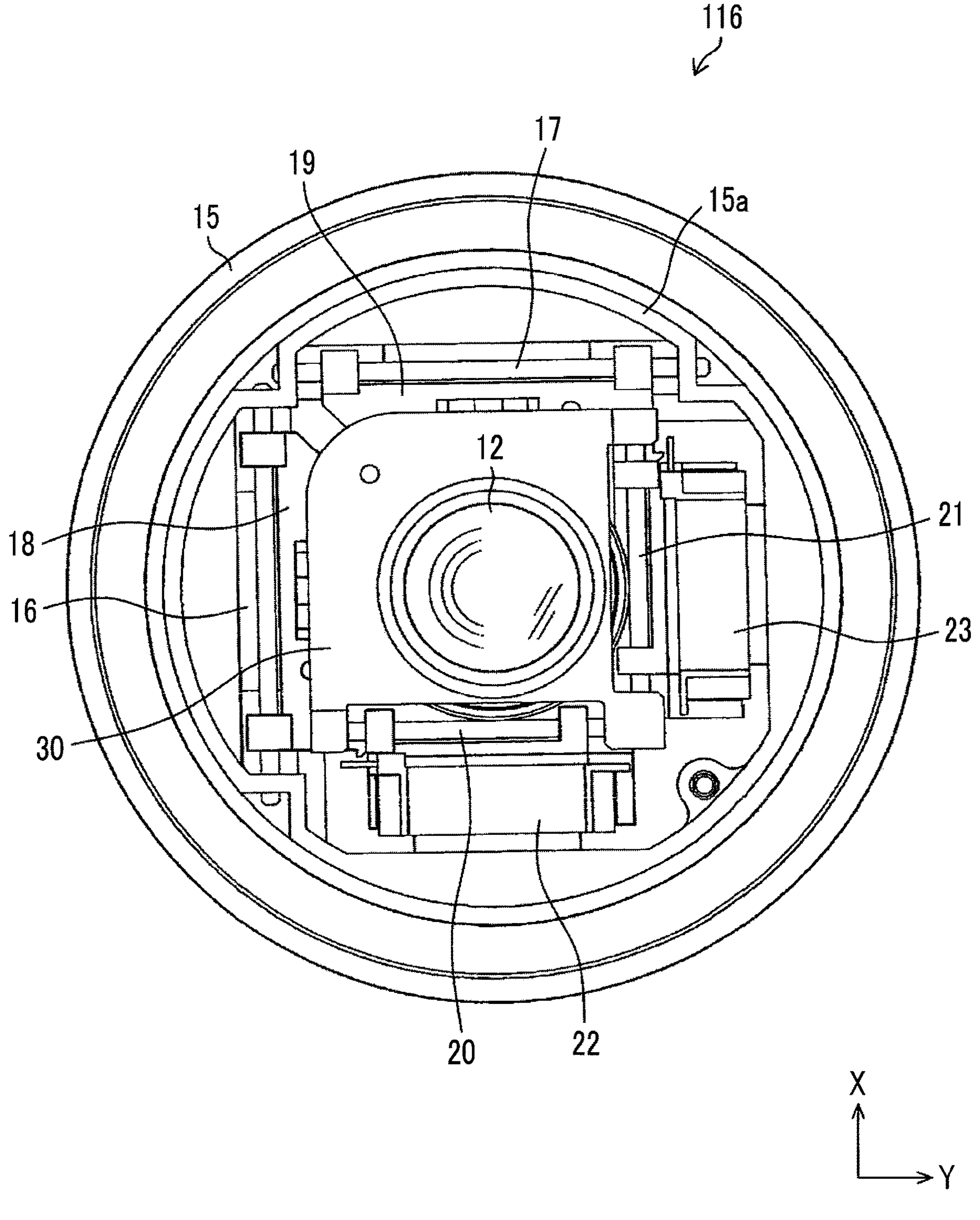
FIG. 6 is a front view of the camera shake-correction mechanism 116 from which a cover is removed.
Figure 7:
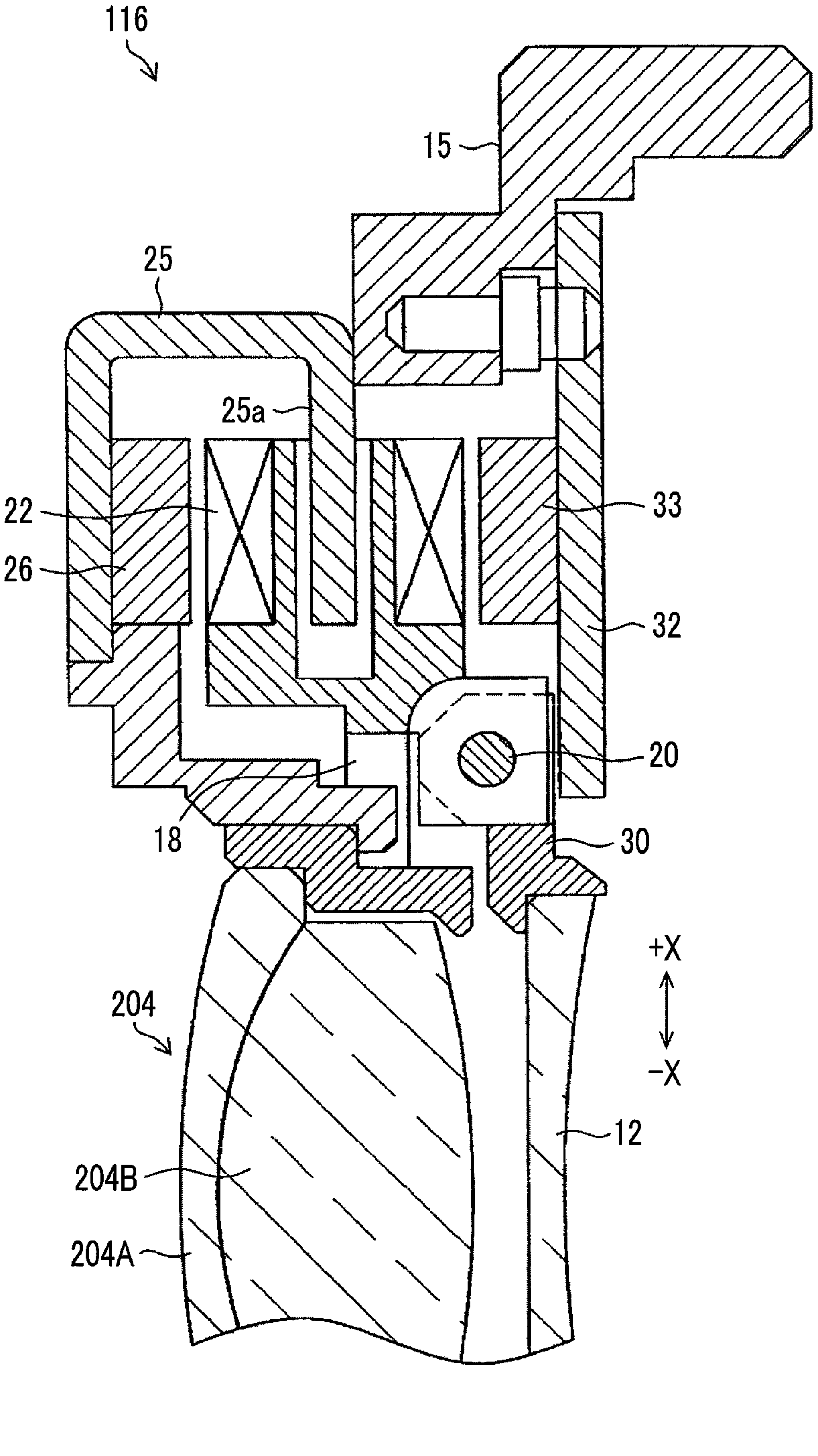
FIG. 7 is a cross-sectional view of main parts of the camera shake-correction mechanism 116.

FIG. 5 is an exploded perspective view of the camera shake-correction mechanism 116 (an example of a correction unit) for moving the vibration-proof lens 12, and FIG. 6 is a front view of the camera shake-correction mechanism 116 from which a cover is removed. Further, FIG. 7 is a cross-sectional view of main parts of the camera shake-correction mechanism 116.

The imaging lens 204 is mounted on the lens barrel 15. The lens barrel 15 is fixed to the lens assembly. Further, the lens barrel 15 is provided with a main guide shaft 16 that extends in the X direction, a main guide shaft 17 that extends in the Y direction, an X slider 18 that is slidable in the X direction, and a Y slider 19 that is slidable in the Y direction. The X slider 18 and the Y slider 19 have a substantially L shape in a plan view.

A pair of shaft holes 18*a* is formed in the X slider 18, and these shaft holes 18*a* are slidably fitted to the main guide shaft 16. Likewise, a pair of shaft holes 19*a* of the Y slider 19 is slidably fitted to the main guide shaft 17.

Further, a pair of shaft holes 18*b* is formed in the X slider 18. The shaft holes 18*b* are slidably fitted to a sub-guide shaft 20 extending in the Y direction. A pair of shaft holes 19*b* of the Y slider 19 is slidably fitted to a sub-guide shaft 21 extending in the X direction.

A flat ring-shaped coil 22 is mounted on the X slider 18. Likewise, a coil 23 is also mounted on the Y slider 19. A yoke 25 in which a permanent magnet 26 is mounted is mounted on the lens barrel 15 to generate an electromagnetic force acting in the X direction between itself and the coil 22. A yoke and a permanent magnet, which generate an electromagnetic force acting in the Y direction between the coil 23 and them, are not shown.

A lens holder 30 holds the vibration-proof lens 12. A pair of holes 30*a* is formed in the lens holder 30, and both ends of the sub-guide shaft 21 extending in the X direction are fitted to these holes 30*a* and are fixed by an adhesive or the like so that the sub-guide shaft 21 is not moved. Likewise, the sub-guide shaft 20 is firmly held by a pair of holes 30*b*.

A cover 32 is disposed on the lens holder 30 so as to hide the X slider 18 and the Y slider 19. The cover 32 is placed on a step 15*a* of the lens barrel 15. Two permanent magnets 33 and 34 are mounted on the inner surface of the cover 32. The permanent magnet 33 faces the yoke 25, and the permanent magnet 34 faces another yoke (not shown).

As shown in FIG. 7, the permanent magnets 26 and 33 are positioned on both sides of the coil 22 and a bent piece 25*a* of the yoke 25 is inserted into the coil 22. In a case where current flows in the coil 22, an electromagnetic force is generated from a magnetic field generated around the coil 22 and the magnetic fields of the permanent magnets 26 and 33.

This electromagnetic force acts in +X direction or −X direction according to the direction of the current of the coil 22 and moves the X slider 18 in +X direction or −X direction. Likewise, in a case where current flows in the coil 23, the Y slider 19 is moved in +Y direction or −Y direction by an electromagnetic force that is generated from a magnetic field generated around the coil 23 and the magnetic fields of the permanent magnet (not shown) and the permanent magnet 34.

Further, an X Hall element 40 and a Y Hall element 41 are received in holes 15*b* and 15*c* of the lens barrel 15, respectively. The X Hall element 40 generates a voltage in response to the magnetic field of a small magnet 42 embedded on the lower surface of the X slider 18. This voltage corresponds to the position of the X slider 18 in the X direction. Furthermore, the Y Hall element 41 also generates a voltage in response to the magnetic field of a small magnet 43 embedded on the lower surface of the Y slider 19, and this voltage corresponds to the position of the Y slider 19 in the Y direction.

The X Hall element 40 and the Y Hall element 41 generate signals in the voltage range of, for example, 0 to 5 V according to the position of the vibration-proof lens 12. In a state where the X slider 18 is positioned at an X reference position and the Y slider 19 is positioned at a Y reference position, the optical axis of the vibration-proof lens 12 coincides with the optical axis 14 of the optical system and both the output signals of the X Hall element 40 and the Y Hall element 41 are 2.5 V (reference voltage) that are a reference voltage.

<Action of Camera Shake-Correction Control Unit>

In a case where the power source of the digital camera 200 is turned on, the camera shake-correction control unit 117 (see FIG. 2) sets a control target value signal to a reference voltage (2.5 V). Then, the camera shake-correction control unit 117 performs the feedback control of the direction and magnitude of current to be supplied to the coils 22 and 23 so that the output signals of the X Hall element 40 and the Y Hall element 41 reach the reference voltage set as the control target value signal. Due to this feedback control, the X slider 18 is moved toward the X reference position and the Y slider 19 is moved toward the Y reference position. In a case where the X slider 18 and the Y slider 19 are set to the reference positions, the optical axis of the vibration-proof lens 12 coincides with the optical axis 14 of the optical system.

In the camera shake-correction-unavailable mode, the control target value signal is maintained at the reference voltage even though a camera shake occurs. Accordingly, the vibration-proof lens 12 is being stopped even though a camera shake occurs.

On the other hand, in the camera shake-correction mode, the vibration-proof lens 12 is moved together with the lens holder 30 according to a camera shake. In a case where a camera shake occurs, the angular velocity sensor 50 generates angular velocity signals in the X direction and the Y direction. The angular velocity signals in the X direction and the Y direction are individually integrated, and are converted into angle signals in the X direction and the Y direction, respectively. The angle signal is converted into a lens displacement signal corresponding to the linear movement of the vibration-proof lens 12 that is required to correct an image shake corresponding to this angle (shake angle). The obtained lens displacement signal is added to the reference voltage (2.5 V), and becomes a control target value signal.

Here, since the lens displacement signal has a plus sign or a minus sign according to the direction of a camera shake, the control target value signal fluctuates from the reference voltage (2.5 V) as the middle.

For example, in a case where a camera shake occurs in +X direction, a lens displacement signal required to correct the camera shake is added to the reference voltage and a control target value signal is calculated. Then, the direction and magnitude of the current of the coil 22 are determined so that the output signal of the X Hall element 40 becomes the control target value signal. An electromagnetic force in −X direction acts on the coil 22 due to a magnetic field, which is generated in a case where current flows in the coil 22, and the magnetic fields of the permanent magnets 26 and 33. The X slider 18 is moved along the main guide shaft 16 in −X direction by this electromagnetic force. Further, since the X slider 18 is connected to the lens holder 30 through the sub-guide shaft 20, the X slider 18 pushes the lens holder 30 in −X direction.

Here, the sub-guide shaft 21 fixed to the lens holder 30 is guided by the shaft holes 19*b* of the Y slider 19. Accordingly, the X slider 18 and the lens holder 30 are moved together while being guided by the main guide shaft 16 and the pair of shaft holes 19*a* of the Y slider 19.

In a case where the X slider 18 is moved to a lens position corresponding to the control target value signal, the output signal of the X Hall element 40 corresponds to the control target value signal. Accordingly, a subject image formed on the CCD 13 is not moved much. Therefore, electrical signals of a clear image are generated from the CCD 13.

In a case where a camera shake is stopped, centering control is performed so that the lens displacement signal gradually returns to 0. As a result, the control target value signal becomes the reference voltage (2.5 V), and the direction and magnitude of the current of the coil 22 are determined so that the output signal of the X Hall element 40 returns to the reference voltage. Accordingly, the X slider 18 is gradually moved toward the X reference position. After the X slider 18 returns to the X reference position, the direction and magnitude of the current of the coil 22 are controlled so that the X slider 18 is maintained at the X reference position. Since the lens holder 30 is moved together with the X slider 18, the lens holder 30 is in a state where the optical axis of the vibration-proof lens 12 coincides with the optical axis 14 of the optical system.

Further, in a case where a camera shake in −X direction occurs, a positive lens displacement signal having a value corresponding to the degree of a camera shake is added to the reference voltage and a control target value signal is calculated. The direction and magnitude of the current of the coil 22 are determined so that the output signal of the X Hall element 40 becomes the control target value signal. In a case where current flows in the coil 22, the X slider 18 is moved along the main guide shaft 16 in +X direction. In a case where the camera shake in −X direction is removed, the X slider 18 gradually returns to the X reference position and is maintained at the X reference position. In a case where the X slider is positioned at the X reference position, the optical axis of the vibration-proof lens 12 coincides with the optical axis 14 of the optical system.

The same applies to a camera shake in the Y direction. In regard to the camera shake in the Y direction, the Y slider 19 is moved in the Y direction by the coil 23. In this case, the lens holder 30 is pushed in the Y direction through the sub-guide shaft 21. The Y slider 19 is guided by the main guide shaft 17, and the sub-guide shaft 20 of the lens holder 30 is guided by the shaft holes 18*b* of the X slider 18. Since the movement of an image caused by a camera shake in the Y direction is prevented in a case where the lens holder 30 is moved in the Y direction together with the Y slider 19, a subject image to be formed on the CCD 13 is substantially stopped. In a case where the camera shake in the Y direction is removed, the Y slider 19 gradually returns to the Y reference position by centering control.

Since an actual camera shake occurs in both the X direction and the Y direction, the lens holder 30 is simultaneously moved in both the X direction and the Y direction.

<Electric Configuration of Camera Shake-Correction Control Unit>

Figure 8:
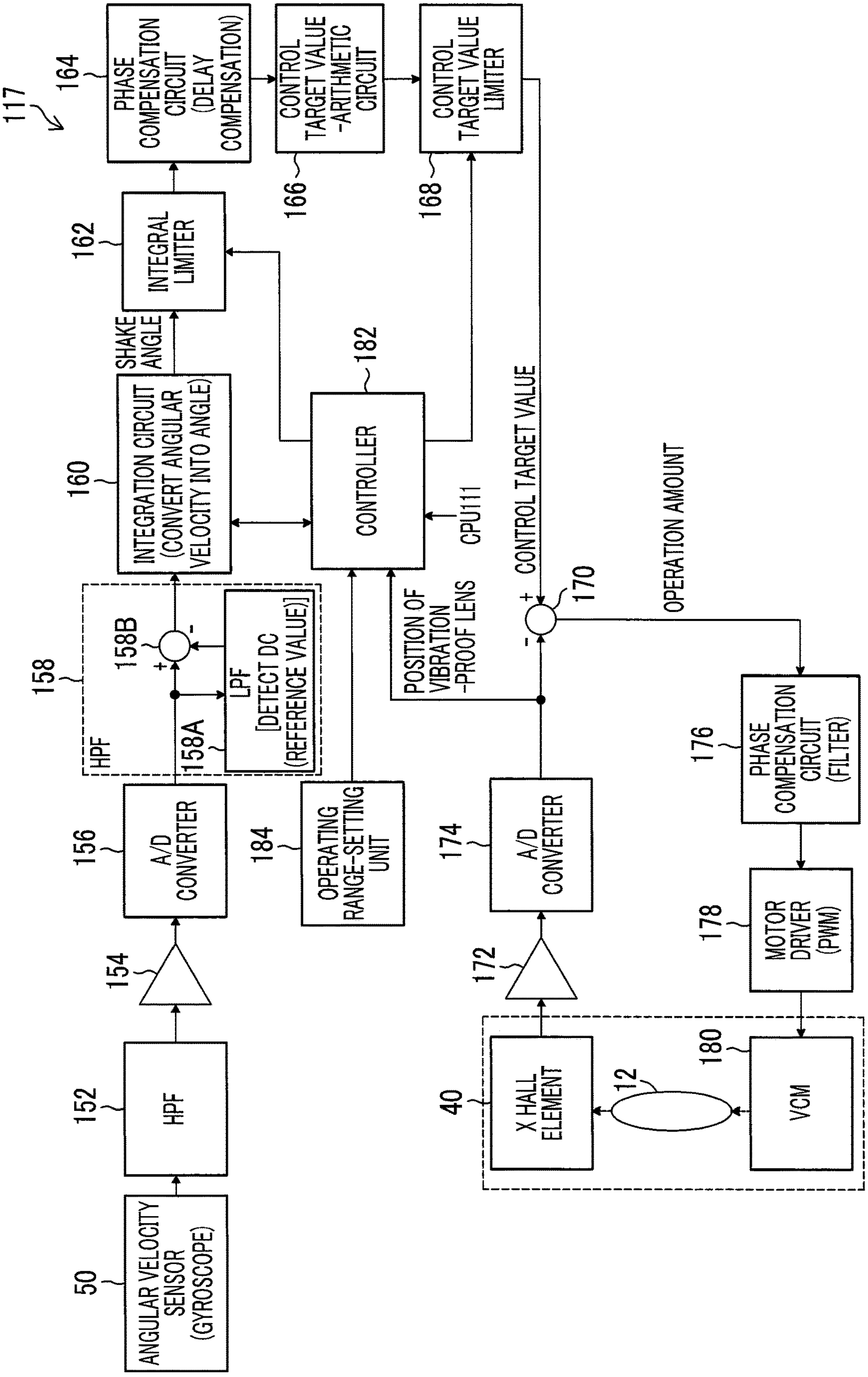
FIG. 8 is a block diagram showing an example of the electric configuration of a camera shake-correction control unit 117.

FIG. 8 is a block diagram showing an example of the electric configuration of the camera shake-correction control unit 117. The camera shake-correction control unit 117 includes two systems, that is, a camera shake-correction control unit corresponding to the X direction and a camera shake-correction control unit corresponding to the Y direction, but both the systems have the same configuration. Accordingly, only the camera shake-correction control unit corresponding to the X direction will be representatively described here.

As shown in FIG. 8, the camera shake-correction control unit 117 comprises the angular velocity sensor 50, a high-pass filter (HPF) 152, an analog amplifier 154, an A/D converter 156, an HPF 158, an integration circuit 160, an integral limiter 162, a phase compensation circuit 164, a control target value-arithmetic circuit 166, a control target value limiter 168, a subtractor 170, an analog amplifier 172, an A/D converter 174, a phase compensation circuit 176, a motor driver 178, a voice coil motor (VCM) 180, a controller 182 (an example of a control unit), and an operating range-setting unit 184, in addition to the above-mentioned X Hall element 40. The controller 182 is realized by the operation of one or a plurality of processors (not shown).

The angular velocity sensor 50 detects the angular velocity of the imaging unit 10 (see FIG. 4) in the X direction and the Y direction. Here, the angular velocity sensor 50 outputs an angular velocity signal (voltage signal), which corresponds to the angular velocity in the X direction, to the analog HPF 152. The HPF 152 removes a DC component of the input angular velocity signal. The output signal of the HPF 152 is input to the A/D converter 156 through the analog amplifier 154.

The A/D converter 156 converts the input analog angular velocity signal into a digital angular velocity signal, and inputs the digital angular velocity signal to the digital HPF 158. The HPF 158 includes a low-pass filter (LPF) 158A, which detects the reference value of DC, and a subtractor 158B, and the subtractor 158B subtracts the reference value, which is detected by the LPF 158A, from the angular velocity signal. Accordingly, an angular velocity signal having a low frequency, which cannot be regarded as a camera shake, is removed.

The angular velocity signal, which is output from the digital HPF 158, is integrated by the integration circuit 160 and is converted into an angle (shake angle) signal. That is, the integration circuit 160 integrates an input angular velocity signal A1 to converts the input angular velocity signal A1 into an angle signal $A_{n+1}$. The following equation is used for this integration.

$$A_{n+1}=\alpha\times A1+A_n \quad \text{(Equation 1)}$$

Here, $\alpha$ is a coefficient, and $A_n$ is a previous integrated value that is read from a register.

The tilt angle of the optical system, which is caused by a camera shake, is calculated by this integration. An obtained angle signal $A_{n+1}$ is sent to the integral limiter 162. In a case where the tilt angle exceeds a limit angle, the integral limiter 162 cuts a portion of the tilt angle exceeding the limit angle. Accordingly, the maximum value of the angle signal $A_{n+1}$ becomes the limit angle. This limit angle (the limit value of each of the upper limit and the lower limit of a shake angle) is given from the controller 182.

An angle signal, which is output from the integral limiter 162, is input to the phase compensation circuit 164. The phase compensation circuit 164 compensates the delay of an angle signal that is delayed from an actual angle by the arithmetic operation or the like.

The angle signal of which the phase is compensated by the phase compensation circuit 164 is input to the control target value-arithmetic circuit 166, and is converted into a control target value that represents a lens position in the X direction to which the vibration-proof lens 12 is to be moved to correct the shake of the subject image of the CCD 13.

The control target value, which is subjected to an arithmetic operation by the control target value-arithmetic circuit 166, is input to the control target value limiter 168. Since the movable range of the vibration-proof lens 12 is set in the control target value limiter 168 by the controller 182, the control target value limiter 168 limits the input control target value so that a control target value to be output does not exceed the preset movable range.

A control target value, which is output from the control target value limiter 168, is input to the positive input of the subtractor 170.

On the other hand, a lens position signal, which represents the current position of the vibration-proof lens 12, is input to the negative input of the subtractor 170. The current position of the vibration-proof lens 12 is detected by the X Hall element 40. That is, the X Hall element 40 outputs a detection signal (voltage signal) that corresponds to the lens position of the vibration-proof lens 12. This detection signal is input to the A/D converter 174 through the analog amplifier 172. The A/D converter 174 converts an analog detection signal into a digital signal, and outputs the converted signal to the negative input of the subtractor 170 as a lens position signal that represents the current position of the vibration-proof lens 12.

The subtractor 170 obtains a difference between the control target value and the lens position signal (current position), and outputs this difference as an operation amount of the vibration-proof lens 12.

The operation amount, which is output from the subtractor 170, is subjected to the phase compensation by the phase compensation circuit 176, and is then applied to the motor driver 178. The motor driver 178 generates a driving signal, which is subjected to pulse width modulation according to the input operation amount, and outputs this driving signal to the VCM 180 that includes the coil 22 shown in FIG. 5.

Accordingly, the vibration-proof lens 12 is driven in the X direction by a moving distance corresponding to the operation amount, and is controlled so that the shake of the subject image caused by the camera shake of the digital camera 200 in the X direction does not occur. A camera shake in the Y direction is also corrected in the same manner as the camera shake in the X direction.

The controller 182 controls the integration circuit 160, the integral limiter 162, and the control target value limiter 168. The controller 182 acquires an integration result (angle signal) from the integration circuit 160, acquires the lens position signal of the vibration-proof lens 12 from the A/D converter 174, acquires a signal, which represents the movable range, from the operating range-setting unit 184, and acquires signals, which are related to the operation and state of the digital camera 200, from the CPU 111 (see FIG. 3).

The movable range of the vibration-proof lens 12 is set in the operating range-setting unit 184. The controller 182 acquires the movable range, which is set in the operating range-setting unit 184, and sets the movable range in the control target value limiter 168.

Further, in a case where the controller 182 acquires a signal representing the camera shake-correction-unavailable mode from the CPU 111, the controller 182 resets the integrated value (angle) of the integration circuit 160 to 0 and stops the integral operation of the integration circuit 160 or allows the integration circuit 160 to integrate 0. Accordingly, since the control target value is 0 in a case where the middle position of the operating range of the vibration-proof lens 12 is set as 0, the vibration-proof lens 12 is in a state where the vibration-proof lens 12 is stopped at the middle position of the operating range.

On the other hand, in a case where the controller 182 acquires a signal representing the camera shake-correction mode from the CPU 111, the controller 182 enables the integral operation of the integration circuit 160. Further, the CPU 111 outputs the signal of the switch S1, which is turned on in a case where the shutter button 208 is half pressed, and the signal of the switch S2, which is turned on in a case where the shutter button 208 is fully pressed, to the controller 182.

The controller 182 enables the integral operation of the integration circuit 160 in the camera shake-correction mode, but corrects a camera shake to a value that allows the integration result (angle) to be slightly reduced and performs centering control for gradually returning the vibration-proof lens 12 to an optical center in a period other than a period where the switch S1 or the switch S2 is turned on. Accordingly, vibration-proof accuracy deteriorates but it is possible to avoid a case where a vibration-proof operation cannot be performed. On the other hand, the controller 182 does not perform processing for correcting the integration result (angle) in a period where the switch S1 or the switch S2 is turned on, and increases vibration-proof accuracy in this period.

<Problems of Camera Shake Correction>

In a case where the maximum movable range of the vibration-proof lens 12 has a rectangular shape, the size of an image circle needs to be increased by an increase in the size of any lens other than the vibration-proof lens 12 to ensure the peripheral illumination viewed from an image plane. On the other hand, in a case where the maximum movable range of the vibration-proof lens 12 has a circular shape, an image circle viewed from an image plane is 0.707 times a rectangle. Accordingly, since the size of any lens other than the vibration-proof lens 12 can be made small, an image circle can be minimized.

In this embodiment, the maximum movable range of the vibration-proof lens 12 is a range that is positioned inward from the mechanical limit values (mechanical limits) of the movement of the X slider 18 and the Y slider 19 by a predetermined distance, and is a circular range that corresponds to the shape of the image circle of the entire lens including the imaging lens 204. In a case where the movable range has a circular shape, the effective diameter of the entire lens can be minimized.

However, in a case where a panning operation for shaking the digital camera 200 in a horizontal direction and/or a tilt operation for shaking the digital camera 200 in a vertical direction is performed in a state where the optical axis of the vibration-proof lens 12 is present at a position displaced from the center of the movable range, the correctable range in the horizontal direction and the correctable range in the vertical direction affect each other due to the positions thereof. For this reason, there is a case where camera shake correction suddenly stops. In such a case, it is difficult to capture a subject by the LCD monitor 210 or the electronic finder (not shown).

Figure 9:
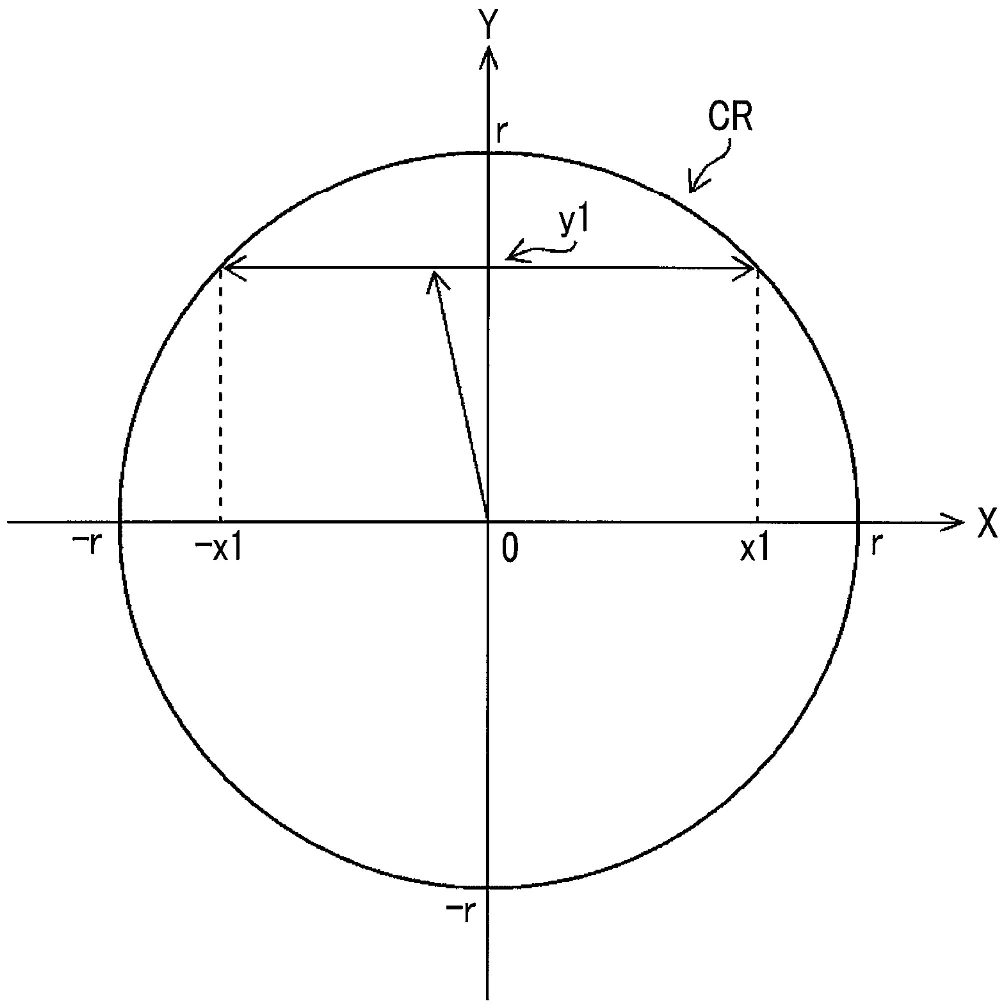
FIG. 9 is a diagram illustrating an influence of a correctable range.

FIG. 9 is a diagram illustrating an influence of the correctable range. As shown in FIG. 9, the movable range of the optical axis of the vibration-proof lens 12 is within a circle CR having a radius r. In a case where the optical axis of the vibration-proof lens 12 is present at the reference position (Y=0) in the Y direction, the optical axis of the vibration-proof lens 12 can be moved to −r from +r in the X direction.

However, in a case where the coordinate of the optical axis of the vibration-proof lens 12 in the Y direction is y1, the movement of the optical axis of the vibration-proof lens 12 in the X direction is limited between −x1 and +x1. Here, "|r|>|x1|" is satisfied.

On the other hand, these limitations are not applied in a case where the movable range has a rectangular shape. However, in a case where the limit value of the operating range of the vibration-proof lens 12 is designed in regard to a rectangular range, the large image circle of the entire lens should be ensured as described above. For this reason, the diameter of the lens needs to be large. Further, since a large space needs to be ensured around a correction optical system, there is a problem that the lens barrel is increased in size.

<Camera Shake-Correction Method>

Figure 10:
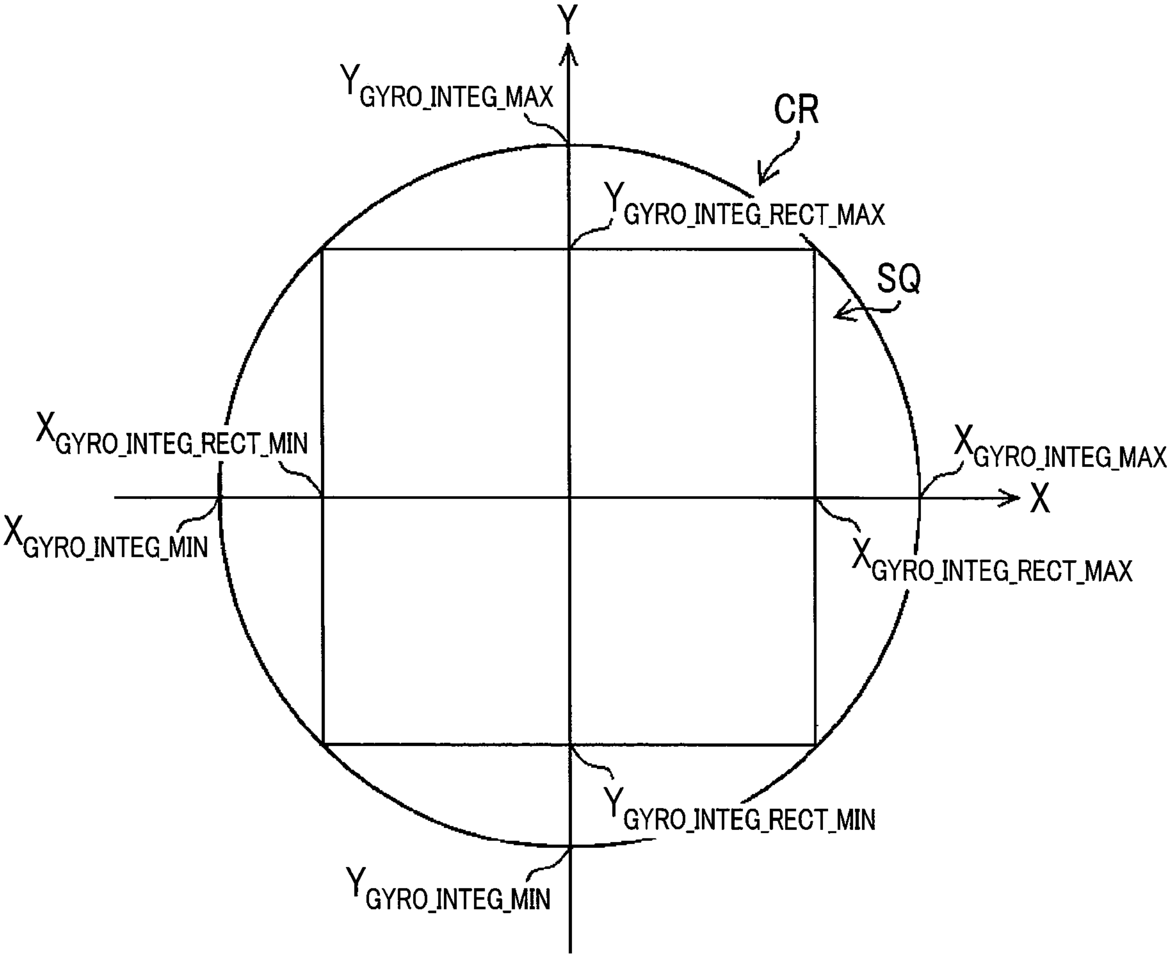
FIG. 10 is a diagram showing the movable range of OIS of the digital camera 200.

A camera shake-correction method (an example of an imaging control method) in a case where the digital camera 200 is set to the camera shake-correction mode will be described. The movable range of the optical axis of the vibration-proof lens 12 of the imaging unit 10 will be written as "the movable range of OIS" below. FIG. 10 is a diagram showing the movable range of OIS of the digital camera 200. In FIG. 10, an X axis is an axis parallel to the horizontal direction of the imaging field of view of the imaging unit 10 and a Y axis is an axis parallel to the vertical direction of the imaging field of view of the imaging unit 10.

The maximum movable range of OIS is a range that is present in a perfect circle CR having a center at the X reference position that is the reference position of the X slider 18 and the Y reference position that is the reference position of the Y slider 19. In the circle CR, the maximum movable range in the X direction is a range of $X_{GYRO\_INTE\_GMIN}$ to $X_{GYRO\_INTEG\_MAX}$ and the maximum movable range in the Y direction is a range of $Y_{GYRO\_INTEG\_MIN}$ to $Y_{GYRO\_INTEG\_MAX}$.

Further, the digital camera 200 has a limited movable range of OIS that is narrower than the maximum movable range of OIS. The limited movable range of OIS of this embodiment is a range that has sides parallel to the horizontal direction and the vertical direction of the imaging field of view of the imaging unit 10, respectively, and is present in a quadrangle SQ, that is, a square (an example of a rectangle) inscribed in the circle CR. In the quadrangle SQ, the movable range in the X direction is a range of $X_{GYRO\_INTEG\_RECT\_MIN}$ to $X_{GYRO\_INTEG\_RECT\_MAX}$ and the movable range of the movable range in the Y direction is a range of $Y_{GYRO\_INTEG\_RECT\_MIN}$ to $Y_{GYRO\_INTEG\_RECT\_MAX}$.

Figure 11:
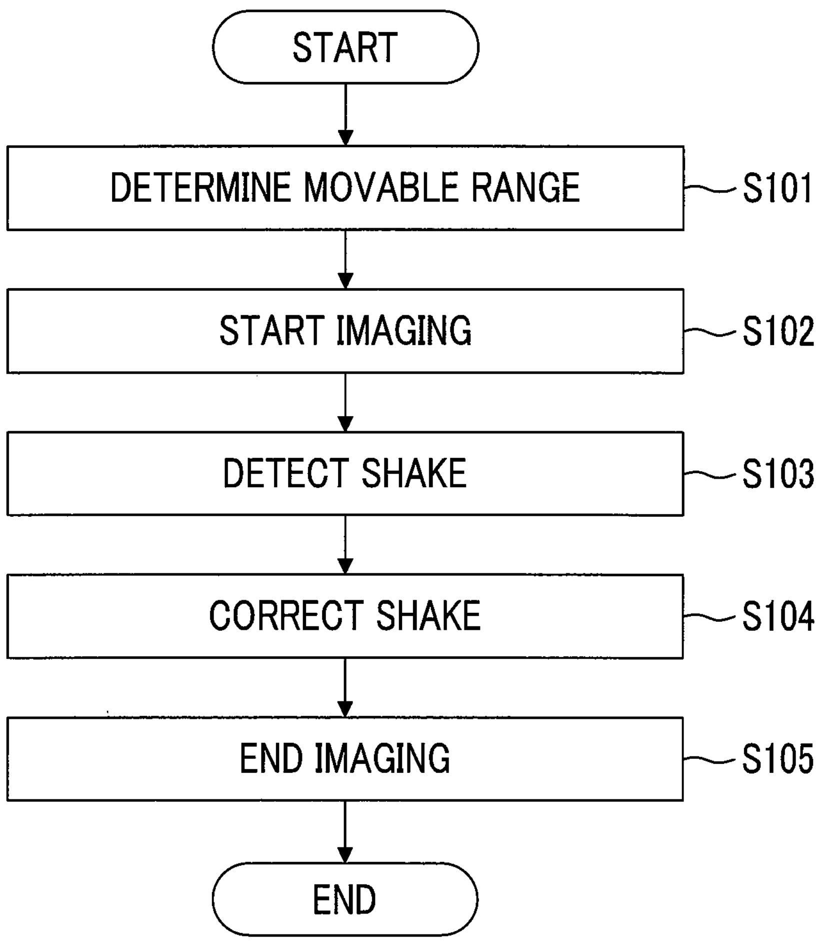
FIG. 11 is a flowchart showing processing of a camera shake-correction method for the digital camera 200.

FIG. 11 is a flowchart showing processing of the camera shake-correction method for the digital camera 200.

First, any one of the circle CR of the maximum movable range or the quadrangle SQ of the limited movable range is determined as the movable range of OIS by the operating range-setting unit 184 (Step S101). Detail will be described later, but, basically, as the movable range of OIS, the circle CR is selected at the time of exposure in a case where only one static image is to be taken according to the operation of the shutter button 208, and the quadrangle SQ is selected in a case where imaging is performed at a certain frame rate, such as a case where a live view image is to be taken, a case where a video is to be taken, and a case where continuous imaging for continuously taking static images is to be performed.

After that, imaging to be performed by the imaging unit 10 is started (Step S102, an example of an imaging step). As described above, a live view image starts to be taken in a case where the digital camera 200 is set to an imaging mode. Further, main imaging is started according to an instruction of the imaging to be performed by the shutter button 208.

In the main imaging, only one static image is taken in a case where the digital camera 200 is set to a static image mode. In a case where the digital camera 200 is set to the continuous imaging mode, a plurality of static images are taken at a constant time interval. In the continuous imaging, for example, six static images are taken per second. Further, a video is taken in a case where the digital camera 200 is set to a video mode. A video is taken at a frame rate of, for example, 60 frames per second.

During imaging, the detection of a camera shake to be performed by the angular velocity sensor 50 is performed (Step S103, an example of a shake detection step) and shake correction according to the detected camera shake is performed (Step S104, an example of a correction step) in the movable range of OIS (an example of a control step). After imaging ends (Step S105), the processing of this flowchart ends.

<Method of Setting Movable Range of OIS>

Next, the detail of a method of setting the movable range of OIS will be described.

First Embodiment

Figure 12:
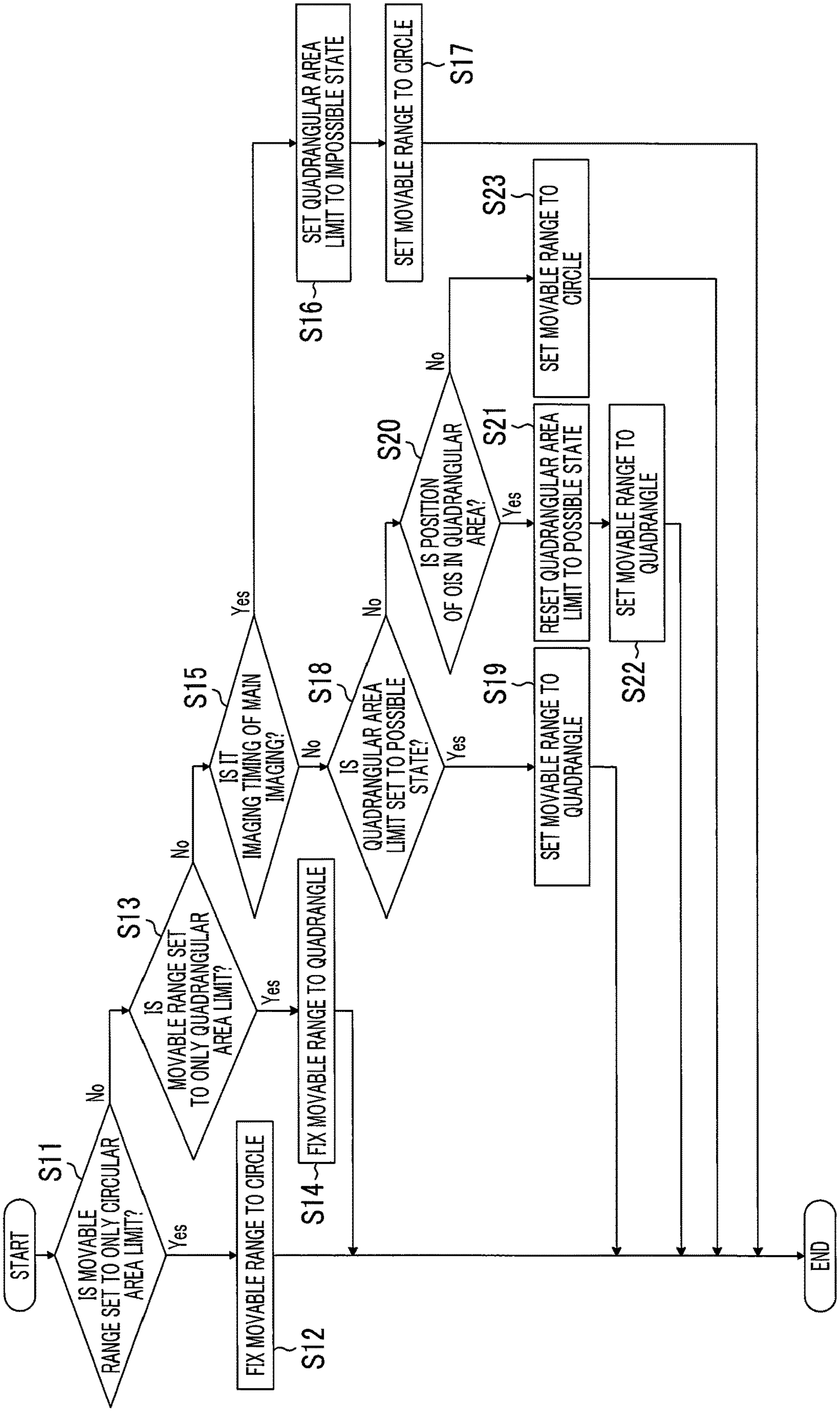
FIG. 12 is a flowchart showing a method of setting the movable range of OIS according to a first embodiment.

FIG. 12 is a flowchart showing a method of setting the movable range of OIS according to a first embodiment. Here, it is assumed that the digital camera 200 is set to the static image mode.

First, it is determined whether or not the movable range of OIS is set to only a circular area limit (Step S11). The digital camera 200 can set the movable range of OIS to only the inside of the circle CR according to the operation of the operation button 212. If the movable range of OIS is set to only the inside of the circle CR, the operating range-setting unit 184 fixes the movable range of OIS to the circle CR (Step S12) and ends the processing of this flowchart.

If the movable range of OIS is not set to only the circular area limit, it is determined whether or not the movable range of OIS is set to only a quadrangular area limit (Step S13). The digital camera 200 can also set the movable range of OIS to only the inside of the quadrangle SQ. If the movable range of OIS is set to only the inside of the quadrangle SQ, the operating range-setting unit 184 fixes the movable range of OIS to the quadrangle SQ (Step S14) and ends the processing of this flowchart.

If the movable range of OIS is not set to only the quadrangular area limit as well as only the circular area limit, it is determined whether or not it is the imaging timing of the main imaging (Step S15). If it is the imaging timing of the main imaging, that is, if an instruction of the imaging to be performed by the shutter button 208 is input, the operating range-setting unit 184 sets the flag of the quadrangular area limit to an impossible state (Step S16) and sets the movable range of OIS to the circle CR (Step S17). As described above, shake correction where the movable range of OIS is set to the circle CR is performed at the time of the main imaging of the static image mode. Accordingly, a shake correction effect can be ensured to the maximum extent.

If it is not the imaging timing of the main imaging, it is determined whether or not the flag of the quadrangular area limit is set to a possible state (Step S18). If the flag of the quadrangular area limit is set to a possible state, the movable range of OIS is set to the quadrangle SQ (Step S19) and the processing of this flowchart ends.

In contrast, if the flag of the quadrangular area limit is set to an impossible state, it is determined whether or not the position of OIS (the position of the optical axis of the vibration-proof lens 12 relative to the CCD 13) is in the range of the quadrangle SQ (Step S20). If the position of OIS is in the range of the quadrangle SQ, the flag of the quadrangular area limit is reset to a possible state (Step S21). Then, the movable range of OIS is set to the quadrangle SQ (Step S22) and the processing of this flowchart ends.

Figure 13:
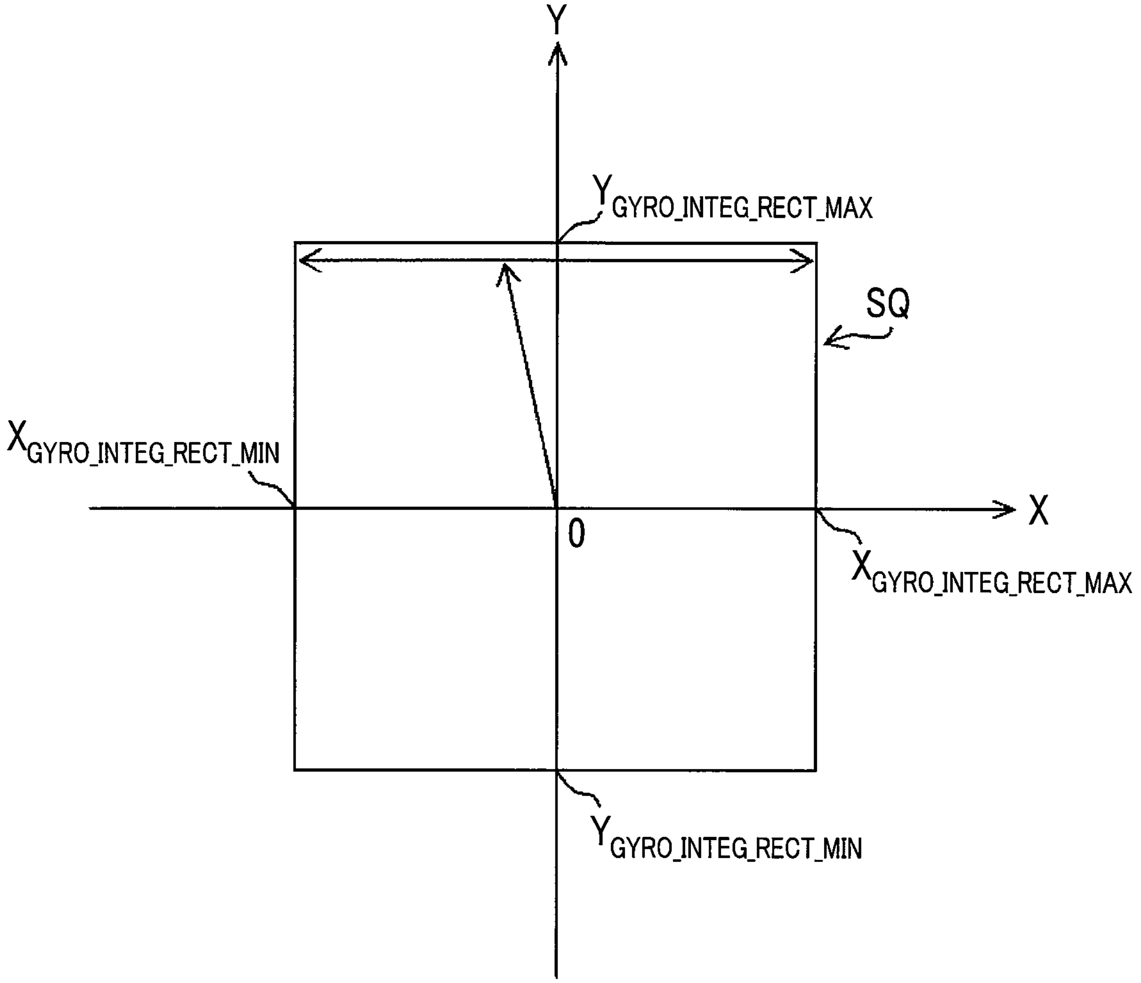
FIG. 13 is a diagram illustrating a correctable range of a quadrangle SQ.

FIG. 13 is a diagram illustrating the correctable range of the quadrangle SQ. As shown in FIG. 13, the OIS can be moved to $X_{GYRO\_INTEG\_RECT\_MIN}$ from $X_{GYRO\_INTEG\_RECT\_MAX}$ in the X direction regardless of the coordinate of OIS in the Y direction in a case where the movable range of OIS is in the quadrangle SQ. Likewise, the OIS can be moved to $Y_{GYRO\_INTEG\_RECT\_MIN}$ from $Y_{GYRO\_INTEG\_RECT\_MAX}$ in the Y direction regardless of the coordinate of OIS in the X direction.

As described above, shake correction where the movable range of OIS is set to the quadrangle SQ is performed in a case where it is not the imaging timing of the main imaging, that is, a live view image is to be taken in the static image mode. Accordingly, since the movable range in the horizontal direction and the movable range in the vertical direction do not affect each other, and subject-following performance can be ensured even in a case where the panning operation and/or the tilt operation is performed, it is easy to capture a subject on the LCD monitor 210.

In a case where the position of OIS is outside the range of the quadrangle SQ immediately after the end of the main imaging or the like, the movable range of OIS is set to the circle CR (Step S23) and the processing of this flowchart ends.

Even in a case where the position of OIS is outside the range of the quadrangle SQ and the movable range of OIS is set to the circle CR, the position of OIS gradually returns to the inside of the range of the quadrangle SQ due to the above-mentioned centering control. Further, there is also a case where the position of OIS returns to the inside of the range of the quadrangle SQ without depending on centering control due to the influence of the subsequent correction of a camera shake, the subsequent change of an angle, or the like.

In such a case, it is determined in the determination of Step S10 that the position of OIS is in the range of the quadrangle SQ in a case where the processing of this flowchart is performed again. As a result, the flag of the quadrangular area limit is reset to a possible state in Step S11, and the movable range of OIS is set to the quadrangle SQ in Step S12. As described above, in a case where the position of OIS is outside the range of the quadrangle SQ, the movable range is switched to the quadrangle SQ after the position of OIS returns to the inside of the range of the quadrangle SQ. Accordingly, it is possible to prevent a sense of discomfort in a case where the movable range is to be switched.

According to this embodiment, the lens can be reduced in size in a case where the maximum movable range of OIS is set to the circle CR. Further, if the movable range is set to the quadrangle SQ included in the circle CR in a case where a live view image is to be taken, the movable range in the horizontal direction and the movable range in the vertical direction do not affect each other and subject-following performance can be ensured.

In addition, since the quadrangle SQ is formed in a square shape that is circumscribed about the circle CR, the movable range can be made as large as possible.

Further, in a case where the movable range is set to the circle CR, a shake correction effect can be ensured to the maximum extent during the main imaging. Furthermore, after the main imaging is completed, the position of OIS is moved to the inside of the quadrangle SQ and the movable range is then switched. Accordingly, it is possible to prevent a sense of discomfort in a case where the movable range is to be switched.

Second Embodiment

Figure 14:
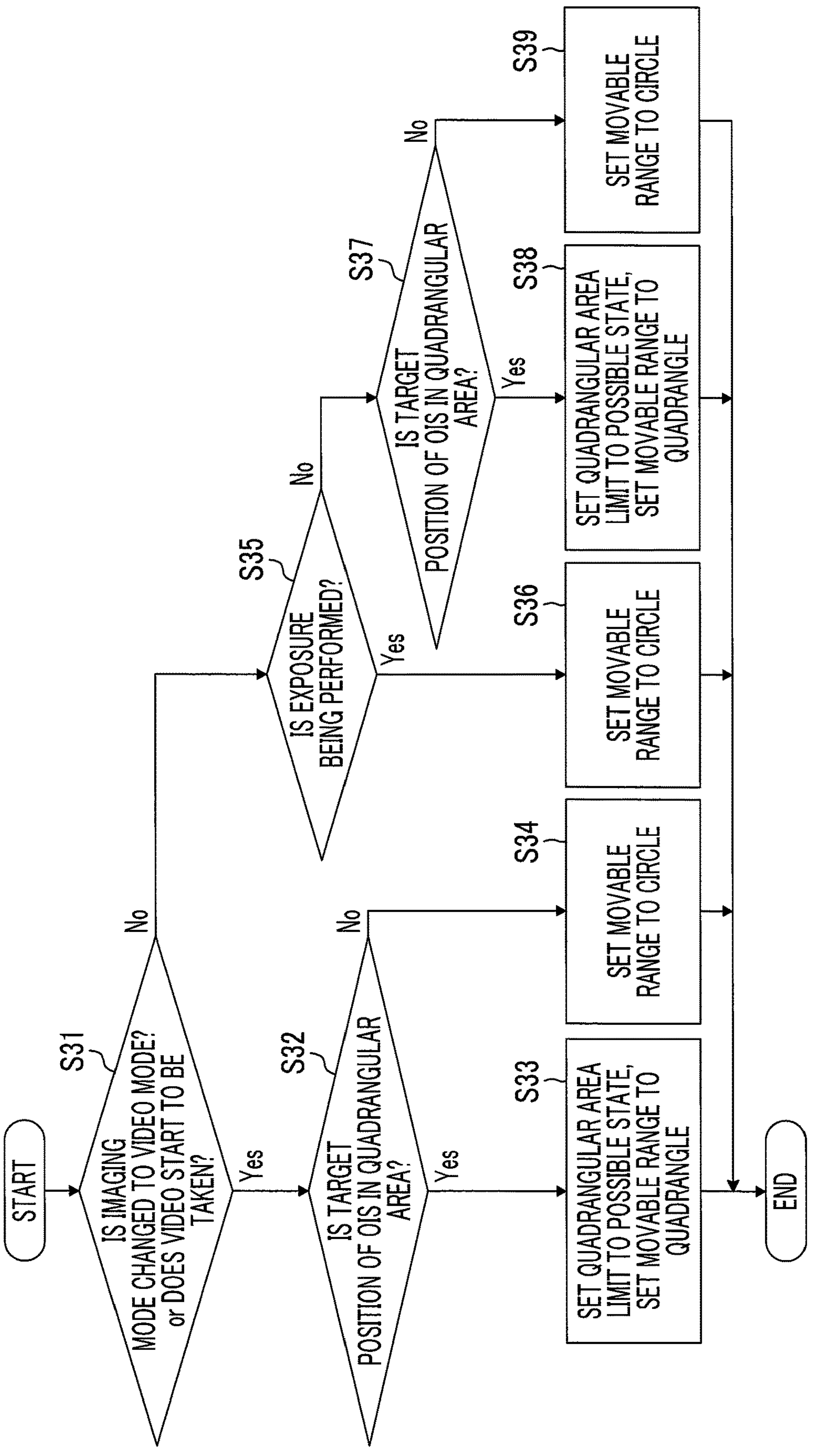
FIG. 14 is a flowchart showing a method of setting the movable range of OIS according to a second embodiment.

FIG. 14 is a flowchart showing a method of setting the movable range of OIS according to a second embodiment.

First, it is determined whether or not an imaging mode is changed to the video mode by the operation of the operation button 212 or whether or not a video starts to be taken by an instruction of the imaging to be performed by the shutter button 208 (Step S31). If an imaging mode is changed to the video mode or if a video starts to be taken, it is determined whether or not the position of OIS is in the range of the quadrangle SQ (Step S32).

If the position of OIS is in the range of the quadrangle SQ, the operating range-setting unit 184 sets the flag of the quadrangular area limit to a possible state, sets the movable range of OIS to the quadrangle SQ (Step S33), and ends the processing of this flowchart.

As described above, shake correction where the movable range of OIS is set to the quadrangle SQ is performed in a case where an imaging mode is changed to the video mode or in a case where a video is to be taken. Accordingly, since the movable range in the horizontal direction and the movable range in the vertical direction do not affect each other and subject-following performance can be ensured, a video of which frames are connected to each other well can be taken.

If the position of OIS is outside the range of the quadrangle SQ, the operating range-setting unit 184 sets the movable range of OIS to the circle CR (Step S34) and ends the processing of this flowchart. Even in a case where the position of OIS is outside the range of the quadrangle SQ and the movable range of OIS is set to the circle CR, the position of OIS returns to the inside of the range of the quadrangle SQ due to the above-mentioned centering control. Accordingly, the movable range of OIS can be switched to the quadrangle SQ in a case where the processing of the flowchart is performed again. Therefore, it is possible to prevent a sense of discomfort in a case where the movable range is to be switched.

On the other hand, it is determined whether or not the exposure of the main imaging in the static image mode is being performed (Step S35) in a case where an imaging mode is not changed into the video mode or in a case where a video does not start to be taken. Here, a case where the exposure of the main imaging is being performed may be a case where the shutter button 208 is fully pressed or may include both a case where the shutter button 208 is half pressed and a case where the shutter button 208 is fully pressed.

If the exposure of the main imaging is being performed, the operating range-setting unit 184 sets the movable range of OIS to the circle CR (Step S36) and ends the processing of this flowchart. As described above, shake correction where the movable range of OIS is set to the circle CR is performed during the exposure of the main imaging. Accordingly, a shake correction effect can be ensured to the maximum extent.

If the exposure of the main imaging is not being performed, it is determined whether or not the position of OIS is in the range of the quadrangle SQ (Step S37).

If the position of OIS is in the range of the quadrangle SQ, the operating range-setting unit 184 sets the flag of the quadrangular area limit to a possible state, sets the movable range of OIS to the quadrangle SQ (Step S38), and ends the processing of this flowchart.

As described above, shake correction where the movable range of OIS is set to the quadrangle SQ is performed in a case where an imaging mode is not changed into the video mode, a video does not start to be taken, and the exposure of the main imaging in the static image mode is not being performed, that is, in a case where a live view image is to be taken. Accordingly, since the movable range in the horizontal direction and the movable range in the vertical direction do not affect each other and subject-following performance can be ensured, it is easy to capture a subject on the LCD monitor 210.

If the position of OIS is outside the range of the quadrangle SQ, the operating range-setting unit 184 sets the movable range of OIS to the circle CR (Step S39) and ends the processing of this flowchart. Since the movable range of OIS is switched to the quadrangle SQ after the position of OIS returns to the inside of the range of the quadrangle SQ as described above, it is possible to prevent a sense of discomfort in a case where the movable range is to be switched.

According to this embodiment, since shake correction where the movable range of OIS is set to the quadrangle SQ is performed in a case where an imaging mode is changed to the video mode or in a case where a video is to be taken, a video of which frames are connected to each other well can be taken.

Third Embodiment

Figure 15:
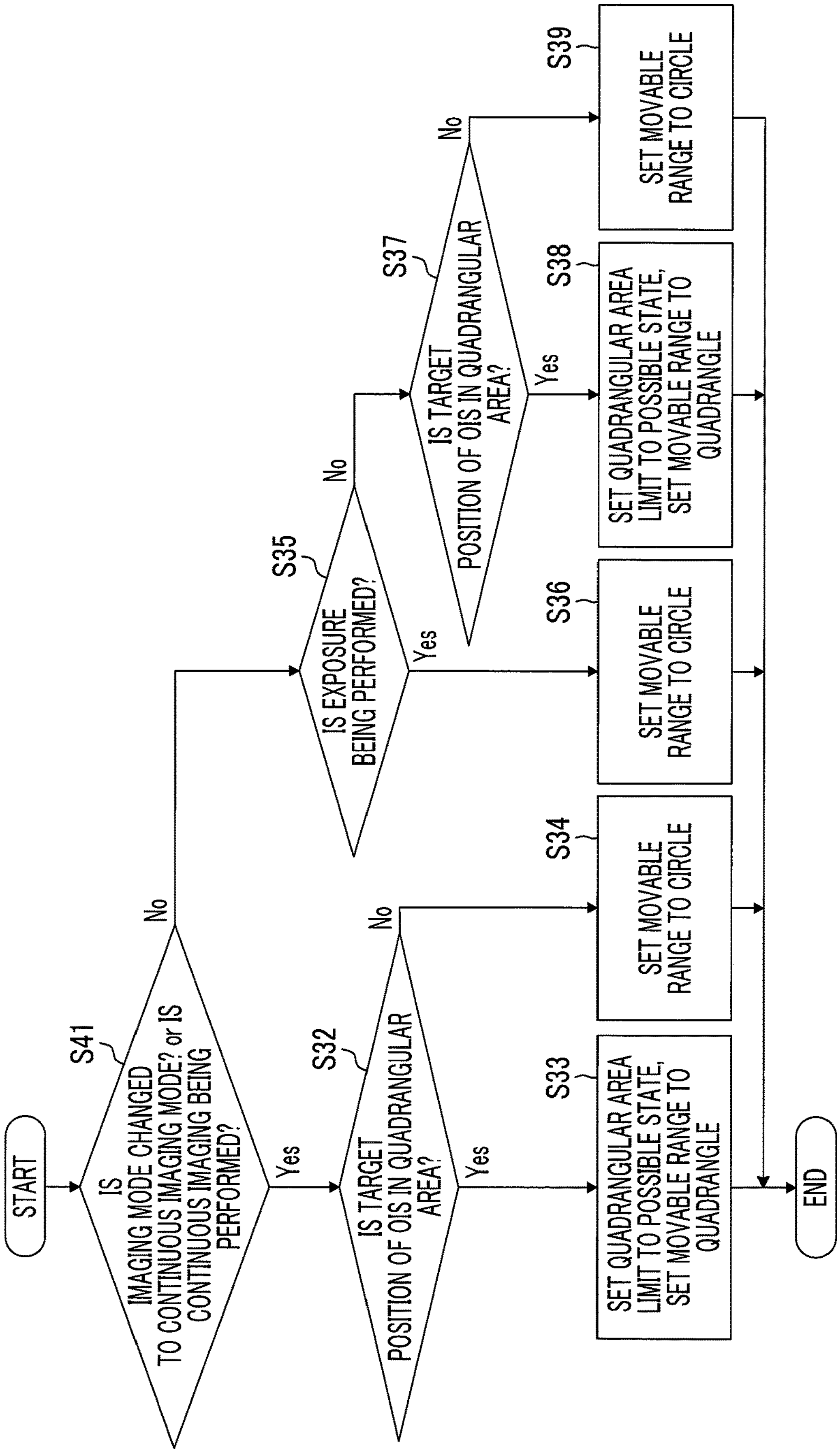
FIG. 15 is a flowchart showing a method of setting the movable range of OIS according to a third embodiment.

FIG. 15 is a flowchart showing a method of setting the movable range of OIS according to a third embodiment. Portions common to the flowchart shown in FIG. 14 will be denoted by the same reference numerals as those of the flowchart shown in FIG. 14, and the detailed description thereof will be omitted.

First, it is determined whether or not an imaging mode is changed to the continuous imaging mode by the operation of the operation button 212 or whether or not continuous imaging is being performed by an instruction of the imaging to be performed by the shutter button 208 (Step S41). Here, a period where continuous imaging is being performed means a period where not only exposure on the CCD 13 is being performed but also the last static image from the first static image among a plurality of static images are taken.

If an imaging mode is changed to the continuous imaging mode or if continuous imaging is being performed, it is determined whether or not the position of OIS is in the range of the quadrangle SQ (Step S32). Then, if the position of OIS is in the range of the quadrangle SQ, the movable range of OIS is set to the quadrangle SQ (Step S33). If the position of OIS is outside the range of the quadrangle SQ, the movable range of OIS is set to the circle CR (Step S34).

If an imaging mode is not changed to the continuous imaging mode and the continuous imaging is also not being performed, processing proceeds to Step S35. The subsequent operation is the same as that of the second embodiment.

According to this embodiment, shake correction where the movable range of OIS is set to the quadrangle SQ is performed in a case where an imaging mode is changed to the continuous imaging mode or in a case where continuous imaging is being performed. Accordingly, a plurality of static images of which frames are connected to each other well can be continuously taken.

Other Embodiments

Figure 16:
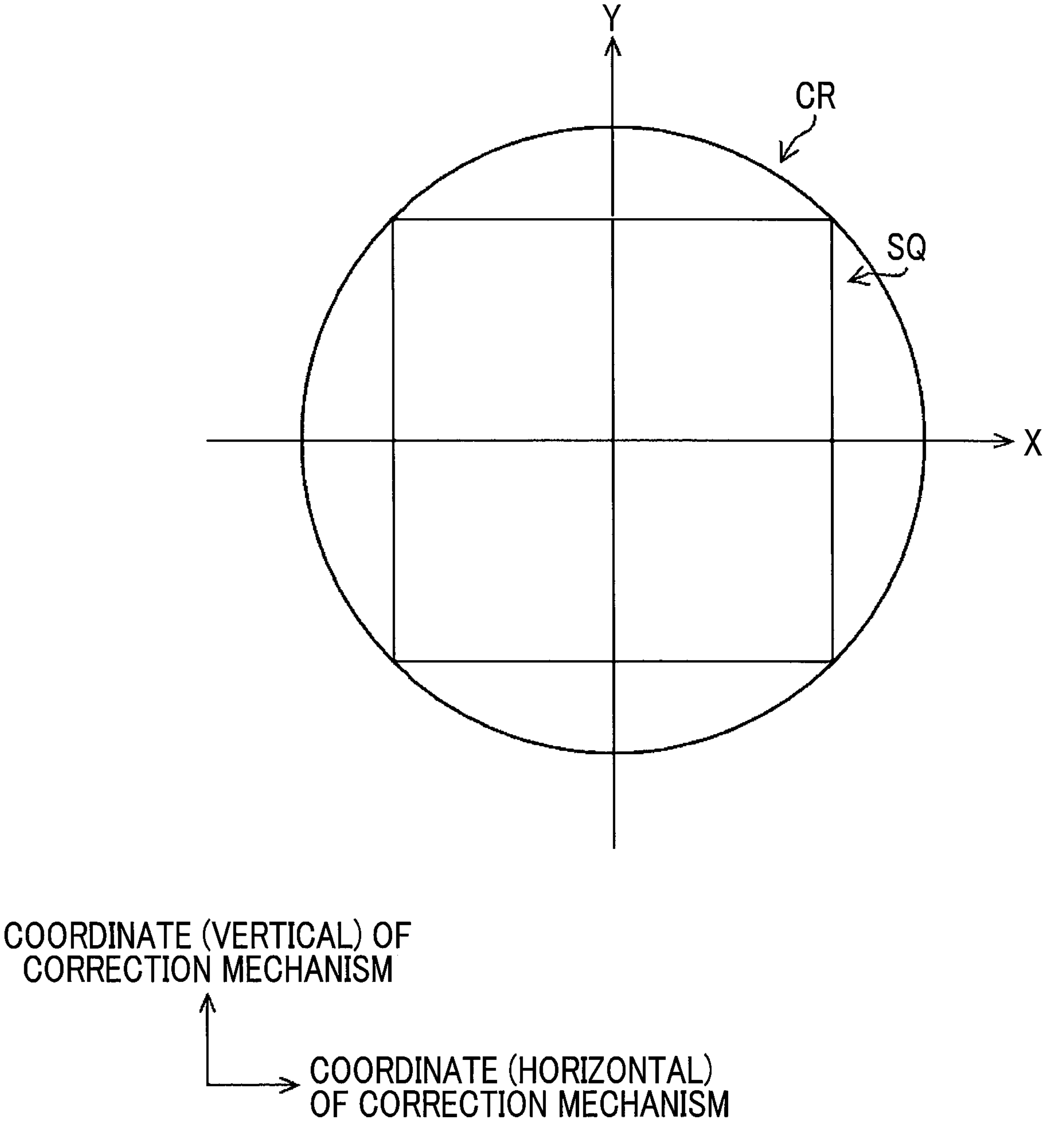
FIG. 16 is a diagram showing a horizontal direction, a vertical direction, and a quadrangle SQ of an imaging field of view according to the first to third embodiments.

FIG. 16 is a diagram showing the X direction that is the horizontal direction of the imaging field of view of the imaging unit 10 according to the first to third embodiments, the Y direction that is the vertical direction of the imaging field of view thereof, and the quadrangle SQ that is the limited movable range of OIS having sides parallel to the X direction and the Y direction, respectively. Further, the coordinate (horizontal) of the correction mechanism in the moving direction of the X slider 18 and the coordinate (vertical) of the correction mechanism in the moving direction of the Y slider 19 are shown as the coordinates of the correction mechanism. The angular velocity sensor 50 detects each of the angular velocities in the directions of the coordinate (horizontal) of the correction mechanism and the coordinate (vertical) of the correction mechanism.

As described above, in the first to third embodiments, the horizontal direction and the vertical direction of the imaging field of view are parallel to the horizontal direction and the vertical direction of the correction mechanism, respectively. However, the directions of the correction mechanism are not limited to directions parallel to the directions of the imaging field of view.

Figure 17:
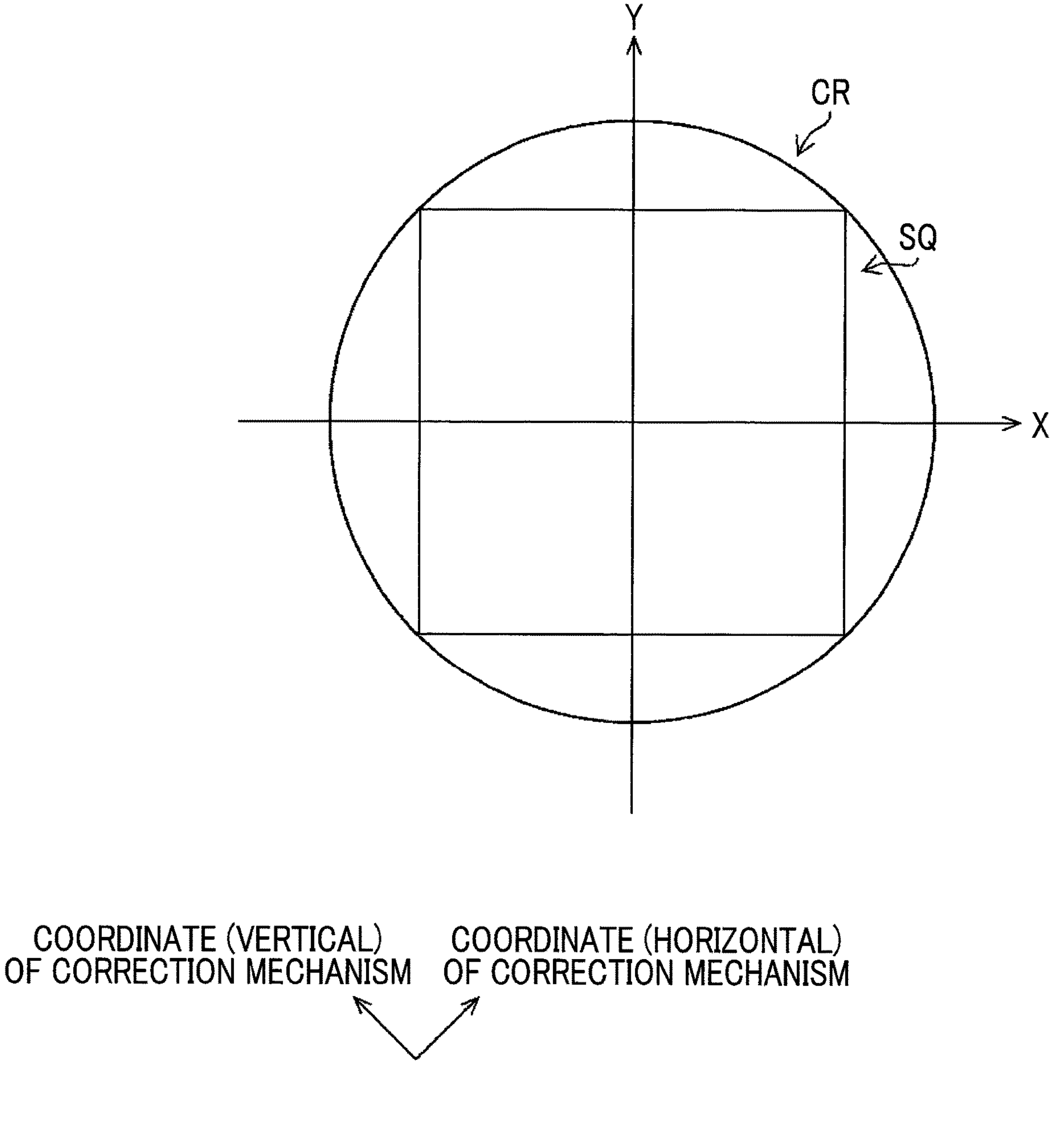
FIG. 17 is a diagram showing a horizontal direction, a vertical direction, and a quadrangle SQ of an imaging field of view according to another embodiment.

FIG. 17 is a diagram showing an X direction that is the horizontal direction of the imaging field of view of an imaging unit 10 according to another embodiment, a Y direction that is the vertical direction of the imaging field of view thereof, and a quadrangle SQ that is the limited movable range of OIS having sides parallel to the X direction and the Y direction, respectively; and shows the coordinate (horizontal) of a correction mechanism in the moving direction of an X slider 18 and the coordinate (vertical) of the correction mechanism in the moving direction of a Y slider 19 as the coordinates of the correction mechanism. Here, the horizontal direction and the vertical direction of the correction mechanism are inclined with respect to the horizontal direction and the vertical direction of the imaging field of view by an angle of 45°, respectively.

As described above, the directions of the correction mechanism may be inclined with respect to the directions of the imaging field of view. Even in this case, the quadrangle SQ, which is the limited movable range, is a quadrangle that has sides parallel to the horizontal direction and the vertical direction of the imaging field of view of the imaging unit 10, respectively. Accordingly, the movable range in the horizontal direction and the movable range in the vertical direction do not affect each other and subject-following performance can be ensured.

The quadrangle SQ is not limited to a square inscribed in the circle CR, and may be a rectangle that is included in the circle CR and has sides parallel to the horizontal direction and the vertical direction of the imaging field of view, respectively.

Further, in the first to third embodiments, camera shake correction for the imaging unit 10 has been performed by so-called lens shift for controlling the movement of the vibration-proof lens 12. However, in the camera shake correction, the vibration-proof lens 12 and the CCD 13 may be allowed to move relative to each other by the control of the movement of at least one of the vibration-proof lens 12 or the CCD 13. For example, the invention can also be applied to a case where the camera shake correction for the imaging unit 10 is performed by so-called sensor shift for controlling the movement of the CCD 13. Further, the lens shift and the sensor shift may be combined with each other so that the relative movement ranges of the vibration-proof lens 12 and the CCD 13 are formed as the circle CR and the quadrangle SQ.

The invention has been described in this embodiment using the digital camera 200 comprising the imaging unit 10, but can also be applied to a mobile phone, a smartphone, a tablet terminal, and the like comprising an imaging unit 10.

An image forming method and the method of setting the movable range of OIS according to this embodiment may be formed as programs that allow a computer to perform the respective steps, and may also be formed as a non-temporary recording medium, such as a compact disk-read only memory (CD-ROM), in which the formed programs are recorded.

The technical scope of the invention is not limited to the scopes described in the above-mentioned embodiments. The components and the like of the respective embodiments can be appropriately combined with each other between the respective embodiments without departing from the scope of the invention.

EXPLANATION OF REFERENCES

10: imaging unit
12: vibration-proof lens
13: CCD
14: optical axis
15: lens barrel
15*a*: step
15*b*: hole
15*c*: hole
16: main guide shaft
17: main guide shaft
18: X slider
18*a*: shaft hole
18*b*: shaft hole
19: Y slider
19*a*: shaft hole
19*b*: shaft hole
20: sub-guide shaft
21: sub-guide shaft
22: coil
23: coil
25: yoke
25*a*: bent piece
26: permanent magnet
30: lens holder
30*a*: hole
30*b*: hole
32: cover
33: permanent magnet
34: permanent magnet

40: X Hall element
41: Y Hall element
42: magnet
43: magnet
50: angular velocity sensor
100: camera shake-correction device
111: CPU
115: motor driver for focusing
116: camera shake-correction mechanism
117: camera shake-correction control unit
119: timing generator
120: CCD driver
122: analog signal processing unit
123: A/D converter
124: image input controller
125: image signal processing circuit
126: compression processing circuit
127: video encoder
129: bus
130: medium controller
131: recording medium
132: memory
133: AF detection circuit
134: AE detection circuit
152: HPF
154: analog amplifier
156: A/D converter
158: HPF
158A: LPF
158B: subtractor
160: integration circuit
162: integral limiter
164: phase compensation circuit
166: control target value-arithmetic circuit
168: control target value limiter
170: subtractor
172: analog amplifier
174: A/D converter
176: phase compensation circuit
178: motor driver
180: VCM
182: controller
184: operating range-setting unit
200: digital camera
202: camera body
204: imaging lens
204A: lens
204B: lens
208: shutter button
210: LCD monitor
212: operation button
A1: angular velocity signal
CR: circle
S1: switch
S2: switch
SQ: quadrangle
S11 to S39: step of processing for setting movable range of OIS
S101 to S105: steps of camera shake-correction processing

What is claimed is:

1. An imaging device comprising:

an imaging unit that includes an imaging element converting a received subject image into an image signal and an imaging lens allowing an incidence ray, which is incident from a subject, to be incident on the imaging element, at least one of the imaging lens or the imaging element being movable in a direction orthogonal to a direction of an optical axis of the incidence ray, and a maximum of a movable range of relative movement of the imaging lens and the imaging element being a circle;

a shake detector that continuously detects a shake of the imaging unit; and a processor configured to correct a shake of the subject image by moving at least one of the imaging lens or the imaging element relative to one another according to the detected shake;

wherein the processor is further configured to limit the movable range of the relative movement, in which the shake of the subject image is corrected, to the inside of a rectangle included in the circle in a case where imaging is performed at a frame rate by the imaging unit.

2. The imaging device according to claim 1, wherein the processor is configured to set the movable range of the relative movement to the inside of the circle in a case where a static image is to be taken.

3. The imaging device according to claim 1, further comprising:

a display unit that displays a live view image allowing a user to check the subject image, wherein the processor is configured to limit the movable range of the relative movement to the inside of the rectangle in a case where the live view image is to be taken.

4. The imaging device according to claim 2, further comprising:

a display unit that displays a live view image allowing a user to check the subject image, wherein the processor is configured to limit the movable range of the relative movement to the inside of the rectangle in a case where the live view image is to be taken.

5. The imaging device according to claim 1, wherein the processor is configured to limit the movable range of the relative movement to the inside of the rectangle in a case where a video is to be taken.

6. The imaging device according to claim 2, wherein the processor is configured to limit the movable range of the relative movement to the inside of the rectangle in a case where a video is to be taken.

7. The imaging device according to claim 3, wherein the processor is configured to limit the movable range of the relative movement to the inside of the rectangle in a case where a video is to be taken.

8. The imaging device according to claim 4, wherein the processor is configured to limit the movable range of the relative movement to the inside of the rectangle in a case where a video is to be taken.

9. The imaging device according to claim 1, wherein the processor is configured to limit the movable range of the relative movement to the inside of the rectangle in a case where continuous imaging for continuously taking static images is to be performed.

10. The imaging device according to claim 2, wherein the processor is configured to limit the movable range of the relative movement to the inside of the rectangle in a case where continuous imaging for continuously taking static images is to be performed.

11. The imaging device according to claim 3, wherein the processor is configured to limit the movable range of the relative movement to the inside of the rectangle in a case where continuous imaging for continuously taking static images is to be performed.

12. The imaging device according to claim 4, wherein the processor is configured to limit the movable range of the relative movement to the inside of the rectangle in a case where continuous imaging for continuously taking static images is to be performed.

13. The imaging device according to claim 5, wherein the processor is configured to limit the movable range of the relative movement to the inside of the rectangle in a case where continuous imaging for continuously taking static images is to be performed.

14. The imaging device according to claim 1, wherein the rectangle is inscribed in the circle.

15. The imaging device according to claim 1, wherein the rectangle is a square.

16. The imaging device according to claim 1, wherein the rectangle has sides parallel to a horizontal direction and a vertical direction of an imaging field of view of the imaging unit, respectively.

17. The imaging device according to claim 1, wherein the processor is configured to limit the movable range of the relative movement to the inside of the rectangle after relative positions of the imaging lens and the imaging element enter the rectangle.

18. The imaging device according to claim 1, wherein the processor is configured to move the imaging lens.

19. The imaging device according to claim 1, wherein the processor is configured to move the imaging element.

20. An imaging control method comprising:

an imaging step of imaging a subject by an imaging unit that includes an imaging element converting a received subject image into an image signal and an imaging lens allowing an incidence ray, which is incident from the subject, to be incident on the imaging element, at least one of the imaging lens or the imaging element being movable in a direction orthogonal to a direction of an optical axis of the incidence ray, and a maximum of a movable range of relative movement of the imaging lens and the imaging element being a circle;

a shake detection step of continuously detecting a shake of the imaging unit; and a correction step of correcting a shake of the subject image by moving at least one of the imaging lens or the imaging element relative to one another according to the detected shake, wherein the movable range of the relative movement, in which the shake of the subject image is corrected, is limited to the inside of a rectangle included in the circle in a case where imaging is performed at a frame rate in the imaging step.

* * * * *